(12) United States Patent
Verma et al.

(10) Patent No.: US 12,493,355 B2
(45) Date of Patent: Dec. 9, 2025

(54) TOUCHLESS PLUMBING CONTROL SYSTEM

(71) Applicant: Kohler Co., Kohler, WI (US)

(72) Inventors: Gaurav Kumar Verma, Telangana (IN); Braden Daniel Schmidt, Sheboygan, WI (US); Drew Johnson, Sheboygan, WI (US); Nikhil Bangar, Pune (IN); Nikhil Sanjay Ghatole, Pune (IN); Jiunn Tyng Chen, Sheboygan, WI (US)

(73) Assignee: Kohler Co., Kohler, WI (US)

( * ) Notice: Subject to any disclaimer, the term of this patent is extended or adjusted under 35 U.S.C. 154(b) by 334 days.

(21) Appl. No.: 18/295,628

(22) Filed: Apr. 4, 2023

(65) Prior Publication Data

US 2023/0333663 A1    Oct. 19, 2023

(30) Foreign Application Priority Data

Apr. 14, 2022    (IN) .............................. 202211022378

(51) Int. Cl.
 *G06F 3/01* (2006.01)
 *G01J 5/10* (2006.01)

(52) U.S. Cl.
 CPC ................. *G06F 3/017* (2013.01); *G01J 5/10* (2013.01)

(58) Field of Classification Search
 CPC ................................... G01J 5/10; G06F 3/017
 USPC ........................................................... 4/623
 See application file for complete search history.

(56) References Cited

U.S. PATENT DOCUMENTS

| 37,888 A | 3/1863 | Schell |
|---|---|---|
| 1,982,509 A | 11/1934 | Frank |
| 2,709,918 A | 6/1955 | Yetter |
| 2,954,146 A | 9/1960 | Hullman |

(Continued)

FOREIGN PATENT DOCUMENTS

| AU | 2016201338 B2 | 11/2016 |
|---|---|---|
| CA | 2557704 A1 | 2/2008 |

(Continued)

OTHER PUBLICATIONS amazon.com, Axor ShowerSolutions Ceiling Connector, posted Jun. 14, 2018, [online], [visited Apr. 26, 2022]. Internet, <URL: https://www.amazon.com/Luxury-Ceiling-Mounted-Chrome_Bathtub/dp/B08DZCBDX1> (Year: 2018).

(Continued)

*Primary Examiner* — Huyen D Le
(74) *Attorney, Agent, or Firm* — Foley & Lardner LLP

(57) ABSTRACT

A control unit for a plumbing assembly includes a first sensor for sensing a gesture and at least one direction associated with the gesture. The control unit also includes a first pair of sensors arranged along a first axis of the control unit, which determine a velocity of the gesture along the first axis. The control unit includes a second pair of sensors arranged a long a second axis of the control unit, which determine a velocity of the gesture along the second axis. The control unit includes at least one controller operably coupled to the first sensor, the first pair of sensors, and the second pair of sensors, where the at least one controller adjusts an operational state of the plumbing assembly based on the velocity of the gesture along the first axis, the velocity of the gesture along the second axis, and the at least one direction.

20 Claims, 19 Drawing Sheets

(56) References Cited

U.S. PATENT DOCUMENTS

| | | |
|---|---|---|
| 3,332,623 A | 7/1967 | Gallant |
| 3,394,589 A | 7/1968 | Genichiro |
| 3,419,188 A | 12/1968 | Matchett |
| 3,491,281 A | 1/1970 | Penn |
| 3,491,381 A | 1/1970 | Cathcart |
| 3,551,919 A | 1/1971 | Forbes |
| 3,576,277 A | 4/1971 | Blackmon |
| 3,639,920 A | 2/1972 | Griffin et al. |
| 3,670,167 A | 6/1972 | Forbes |
| 3,686,669 A | 8/1972 | Toulis |
| 3,796,208 A | 3/1974 | Bloice |
| 3,832,900 A | 9/1974 | Ross |
| 3,895,383 A | 7/1975 | Korman |
| 3,932,871 A | 1/1976 | Foote |
| 3,995,212 A | 11/1976 | Ross |
| 4,004,733 A | 1/1977 | Law |
| D243,240 S | 2/1977 | Dreibelbis |
| 4,023,154 A | 5/1977 | Comeaux |
| 4,072,941 A | 2/1978 | Hamid et al. |
| 4,125,835 A | 11/1978 | Barry |
| 4,134,163 A | 1/1979 | Matsunaga |
| 4,135,397 A | 1/1979 | Krake |
| 4,141,091 A | 2/1979 | Pulvari |
| 4,153,366 A | 5/1979 | Mamon et al. |
| 4,222,410 A | 9/1980 | Geimer |
| 4,289,276 A | 9/1981 | Bollina et al. |
| 4,328,487 A | 5/1982 | Cheal |
| 4,343,433 A | 8/1982 | Sickles |
| 4,357,900 A | 11/1982 | Buschor |
| 4,358,759 A | 11/1982 | Stewart et al. |
| 4,370,763 A | 2/1983 | Dolan |
| 4,402,095 A | 9/1983 | Pepper |
| 4,419,659 A | 12/1983 | Harman et al. |
| 4,433,328 A | 2/1984 | Saphir et al. |
| 4,489,601 A | 12/1984 | Rao et al. |
| 4,520,516 A | 6/1985 | Parsons |
| 4,543,580 A | 9/1985 | Bent et al. |
| 4,567,484 A | 1/1986 | Schilz et al. |
| 4,604,764 A | 8/1986 | Enzo |
| 4,621,264 A | 11/1986 | Yashiro et al. |
| 4,635,673 A | 1/1987 | Gerdes |
| 4,642,641 A | 2/1987 | Campbell |
| 4,651,152 A | 3/1987 | Harmuth |
| 4,664,315 A | 5/1987 | Parmentar et al. |
| 4,667,350 A | 5/1987 | Ikenaga et al. |
| 4,673,935 A | 6/1987 | Spencer |
| 4,677,438 A | 6/1987 | Michiguchi et al. |
| 4,681,141 A | 7/1987 | Wang |
| D291,476 S | 8/1987 | Gregory |
| 4,688,518 A | 8/1987 | Missier |
| 4,697,184 A | 9/1987 | Cheal et al. |
| D292,607 S | 11/1987 | Wu |
| 4,707,867 A | 11/1987 | Kawabe et al. |
| 4,716,605 A | 1/1988 | Shepherd et al. |
| 4,722,372 A | 2/1988 | Hoffman et al. |
| 4,731,058 A | 3/1988 | Doan |
| 4,742,583 A | 5/1988 | Yoshida et al. |
| 4,743,906 A | 5/1988 | Fullerton |
| 4,756,031 A | 7/1988 | Barrett |
| 4,767,922 A | 8/1988 | Stauffer |
| 4,797,621 A | 1/1989 | Anderson et al. |
| 4,809,369 A | 3/1989 | Bowden |
| 4,846,525 A | 7/1989 | Manning |
| 4,883,749 A | 11/1989 | Roberts et al. |
| 4,886,207 A | 12/1989 | Lee et al. |
| 4,891,649 A | 1/1990 | Labaar et al. |
| 4,914,758 A | 4/1990 | Shaw |
| 4,915,347 A | 4/1990 | Iqbal et al. |
| 4,916,455 A | 4/1990 | Bent et al. |
| 4,921,211 A | 5/1990 | Novak et al. |
| 4,941,808 A | 7/1990 | Qureshi et al. |
| 4,949,074 A | 8/1990 | D'Ambrosia et al. |
| 4,952,939 A | 8/1990 | Seed |
| 4,975,703 A | 12/1990 | Delisle et al. |
| 4,979,186 A | 12/1990 | Fullerton |
| 4,981,158 A | 1/1991 | Brondolino et al. |
| 4,998,555 A | 3/1991 | Barhydt, Sr. |
| 4,998,673 A | 3/1991 | Pilolla |
| 5,025,516 A | 6/1991 | Wilson |
| 5,030,956 A | 7/1991 | Murphy |
| 5,031,258 A | 7/1991 | Shaw |
| 5,033,715 A | 7/1991 | Hsieh |
| 5,043,705 A | 8/1991 | Rooz et al. |
| D321,397 S | 11/1991 | Dannenberg |
| 5,074,520 A | 12/1991 | Lee et al. |
| 5,085,373 A | 2/1992 | Behr et al. |
| 5,101,679 A | 4/1992 | Smith et al. |
| D327,529 S | 6/1992 | Dannenberg |
| 5,148,175 A | 9/1992 | Woolfolk |
| 5,150,123 A | 9/1992 | Orlowski et al. |
| 5,150,126 A | 9/1992 | Knepper et al. |
| 5,163,010 A | 11/1992 | Klein et al. |
| 5,173,178 A | 12/1992 | Kawashima et al. |
| 5,175,892 A | 1/1993 | Shaw |
| 5,187,816 A | 2/1993 | Chiou |
| 5,187,818 A | 2/1993 | Barrett et al. |
| 5,199,118 A | 4/1993 | Cole et al. |
| 5,201,906 A | 4/1993 | Schwarz et al. |
| 5,217,035 A | 6/1993 | Van Marcke |
| 5,224,685 A | 7/1993 | Chiang et al. |
| 5,226,629 A | 7/1993 | Millman et al. |
| 5,227,797 A | 7/1993 | Murphy |
| 5,227,799 A | 7/1993 | Kimura et al. |
| 5,234,717 A | 8/1993 | Matsuno et al. |
| 5,243,717 A | 9/1993 | Yasuo |
| 5,249,463 A | 10/1993 | Willson et al. |
| D341,741 S | 11/1993 | Allen et al. |
| D341,873 S | 11/1993 | Allen et al. |
| D341,875 S | 11/1993 | Allen et al. |
| 5,268,166 A | 12/1993 | Barnett et al. |
| D343,445 S | 1/1994 | Allen et al. |
| 5,277,713 A | 1/1994 | Gelain et al. |
| 5,278,567 A | 1/1994 | Nourrcier |
| 5,287,570 A | 2/1994 | Peterson et al. |
| 5,311,189 A | 5/1994 | Nagel |
| 5,322,684 A | 6/1994 | Barnett et al. |
| D350,591 S | 9/1994 | Kawakami |
| 5,345,471 A | 9/1994 | McEwan |
| 5,361,070 A | 11/1994 | McEwan |
| 5,363,108 A | 11/1994 | Fullerton |
| 5,369,818 A | 12/1994 | Barnum et al. |
| 5,384,541 A | 1/1995 | Chu et al. |
| 5,387,200 A | 2/1995 | Kronstadt |
| 5,400,446 A | 3/1995 | Bloemer et al. |
| 5,455,564 A | 10/1995 | Hsiao |
| 5,457,394 A | 10/1995 | McEwan |
| 5,457,990 A | 10/1995 | Oswald et al. |
| 5,460,192 A | 10/1995 | McClain |
| 5,460,210 A | 10/1995 | Koeninger |
| 5,465,094 A | 11/1995 | McEwan |
| 5,471,198 A | 11/1995 | Newham |
| 5,473,311 A | 12/1995 | Hoseit |
| 5,482,250 A | 1/1996 | Kodaira |
| 5,494,674 A | 2/1996 | Barnett et al. |
| 5,504,490 A | 4/1996 | Brendle et al. |
| 5,504,950 A | 4/1996 | Natalizia et al. |
| 5,508,510 A | 4/1996 | Laverty, Jr. et al. |
| 5,510,800 A | 4/1996 | McEwan |
| 5,512,834 A | 4/1996 | McEwan |
| 5,517,198 A | 5/1996 | McEwan |
| 5,519,400 A | 5/1996 | McEwan |
| 5,521,600 A | 5/1996 | McEwan |
| 5,523,760 A | 6/1996 | McEwan |
| 5,527,564 A | 6/1996 | Napadow et al. |
| 5,541,605 A | 7/1996 | Heger |
| 5,543,799 A | 8/1996 | Heger |
| 5,545,140 A | 8/1996 | Conero et al. |
| 5,549,273 A | 8/1996 | Aharon |
| 5,563,605 A | 10/1996 | McEwan |
| 5,570,869 A | 11/1996 | Diaz et al. |
| 5,573,012 A | 11/1996 | McEwan |
| 5,576,627 A | 11/1996 | McEwan |
| 5,577,660 A | 11/1996 | Hansen |
| 5,581,256 A | 12/1996 | McEwan |

(56) References Cited

U.S. PATENT DOCUMENTS

| | | |
|---|---|---|
| 5,586,573 A | 12/1996 | Nortier |
| 5,589,838 A | 12/1996 | McEwan |
| 5,591,412 A | 1/1997 | Jones et al. |
| 5,594,449 A | 1/1997 | Otto |
| 5,603,127 A | 2/1997 | Veal |
| 5,609,059 A | 3/1997 | McEwan |
| 5,610,589 A | 3/1997 | Evans et al. |
| 5,610,611 A | 3/1997 | McEwan |
| 5,611,093 A | 3/1997 | Barnum et al. |
| 5,625,908 A | 5/1997 | Shaw |
| 5,630,216 A | 5/1997 | McEwan |
| 5,634,298 A | 6/1997 | Slopack |
| 5,661,305 A | 8/1997 | Lawrence et al. |
| 5,661,385 A | 8/1997 | McEwan |
| 5,661,490 A | 8/1997 | McEwan |
| 5,664,593 A | 9/1997 | McClain |
| 5,682,164 A | 10/1997 | McEwan |
| 5,692,954 A | 12/1997 | Lee et al. |
| 5,694,653 A | 12/1997 | Harald |
| 5,704,554 A | 1/1998 | Cooper et al. |
| 5,738,727 A | 4/1998 | Cebola et al. |
| 5,738,728 A | 4/1998 | Tisone |
| 5,754,144 A | 5/1998 | McEwan |
| 5,757,320 A | 5/1998 | McEwan |
| 5,765,761 A | 6/1998 | Law et al. |
| 5,765,762 A | 6/1998 | Lee et al. |
| 5,766,208 A | 6/1998 | McEwan |
| 5,767,953 A | 6/1998 | McEwan |
| 5,774,091 A | 6/1998 | McEwan |
| 5,781,942 A | 7/1998 | Allen et al. |
| 5,833,751 A | 11/1998 | Tucker |
| 5,845,844 A | 12/1998 | Zosimodis |
| 5,863,497 A | 1/1999 | Dirksing |
| 5,868,311 A | 2/1999 | Cretu-Petra |
| D408,895 S | 4/1999 | Lai |
| 5,920,278 A | 7/1999 | Tyler et al. |
| 5,922,333 A | 7/1999 | Laughlin |
| D415,560 S | 10/1999 | Lindholm |
| D415,561 S | 10/1999 | Lindholm |
| 5,984,262 A | 11/1999 | Parsons et al. |
| 5,984,985 A | 11/1999 | Malone |
| 5,986,600 A | 11/1999 | McEwan |
| 6,003,794 A | 12/1999 | Hartman et al. |
| 6,019,130 A | 2/2000 | Rump |
| 6,067,040 A | 5/2000 | Puglia |
| 6,067,673 A | 5/2000 | Paese et al. |
| D428,965 S | 8/2000 | Slothower |
| 6,114,971 A | 9/2000 | Nysen |
| 6,138,922 A | 10/2000 | Hartman et al. |
| D438,285 S | 2/2001 | Baghera et al. |
| D438,602 S | 3/2001 | Milrud et al. |
| 6,199,557 B1 | 3/2001 | Laughlin |
| 6,206,340 B1 | 3/2001 | Paese et al. |
| 6,208,248 B1 | 3/2001 | Ross |
| D441,430 S | 5/2001 | Dretzka |
| D441,434 S | 5/2001 | Dretzka |
| D442,676 S | 5/2001 | Dretzka |
| 6,227,466 B1 | 5/2001 | Hartman et al. |
| 6,239,736 B1 | 5/2001 | McDonald et al. |
| 6,239,741 B1 | 5/2001 | Fontana et al. |
| 6,250,601 B1 | 6/2001 | Kolar et al. |
| 6,279,173 B1 | 8/2001 | Denzin et al. |
| 6,279,179 B1 | 8/2001 | Register |
| D447,541 S | 9/2001 | Dretzka |
| 6,302,122 B1 | 10/2001 | Parker et al. |
| 6,302,662 B1 | 10/2001 | Bensley et al. |
| 6,326,062 B1 | 12/2001 | Noakes et al. |
| 6,354,468 B1 | 3/2002 | Riek |
| 6,387,081 B1 | 5/2002 | Cooper |
| 6,388,609 B2 | 5/2002 | Paese et al. |
| 6,390,329 B1 | 5/2002 | Maddox |
| D462,915 S | 9/2002 | Bush |
| 6,443,164 B1 | 9/2002 | Parker et al. |
| RE37,888 E | 10/2002 | Cretu-Petra |
| 6,466,168 B1 | 10/2002 | McEwan |
| 6,481,634 B1 | 11/2002 | Zosimadis |
| D466,428 S | 12/2002 | Bush |
| 6,513,787 B1 | 2/2003 | Jeromson et al. |
| 6,523,193 B2 | 2/2003 | Saraya |
| 6,539,664 B2 | 4/2003 | Katsen et al. |
| 6,549,816 B2 | 4/2003 | Gauthier et al. |
| 6,554,208 B1 | 4/2003 | Venuto, Sr. |
| 6,568,655 B2 | 5/2003 | Paese et al. |
| 6,592,067 B2 | 7/2003 | Denen et al. |
| 6,596,983 B2 | 7/2003 | Brent |
| 6,614,384 B2 | 9/2003 | Hall et al. |
| 6,618,864 B2 | 9/2003 | Veal |
| D487,798 S | 3/2004 | Bayer |
| 6,710,606 B2 | 3/2004 | Morris |
| 6,715,730 B2 | 4/2004 | Ehr |
| 6,729,864 B2 | 5/2004 | Eley |
| 6,745,487 B1 | 6/2004 | Nield |
| 6,748,970 B2 | 6/2004 | Keller |
| 6,793,170 B2 | 9/2004 | Denen et al. |
| 6,797,136 B2 | 9/2004 | Shimamune |
| 6,802,830 B1 | 10/2004 | Waters et al. |
| 6,822,604 B2 | 11/2004 | Hall et al. |
| 6,830,210 B2 | 12/2004 | Formon et al. |
| 6,838,887 B2 | 1/2005 | Denen et al. |
| 6,839,644 B1 | 1/2005 | Woods et al. |
| 6,843,521 B1 | 1/2005 | Oana |
| 6,871,815 B2 | 3/2005 | Moody et al. |
| 6,874,535 B2 | 4/2005 | Parsons et al. |
| 6,903,654 B2 | 6/2005 | Hansen et al. |
| 6,913,203 B2 | 7/2005 | Delangis |
| 6,933,846 B2 | 8/2005 | Moldavsky et al. |
| 6,944,317 B2 | 9/2005 | Pavlovic et al. |
| 6,948,194 B2 | 9/2005 | Todoroki et al. |
| 6,956,498 B1 | 10/2005 | Gauthier et al. |
| 6,962,168 B2 | 11/2005 | McDaniel et al. |
| 6,964,405 B2 | 11/2005 | Marcichow et al. |
| 6,977,588 B2 | 12/2005 | Schotz et al. |
| 6,992,561 B2 | 1/2006 | Sandt et al. |
| 7,004,407 B2 | 2/2006 | Cooper |
| D517,657 S | 3/2006 | Crowell et al. |
| 7,017,856 B2 | 3/2006 | Moody et al. |
| 7,021,494 B2 | 4/2006 | Mazooji et al. |
| 7,028,725 B2 | 4/2006 | Hooker |
| 7,069,941 B2 | 7/2006 | Parsons et al. |
| 7,078,368 B2 | 7/2006 | Laney et al. |
| 7,081,817 B2 | 7/2006 | Zhevelev et al. |
| 7,093,358 B2 | 8/2006 | Akram et al. |
| 7,102,366 B2 | 9/2006 | Denen et al. |
| 7,104,519 B2 | 9/2006 | O'Maley et al. |
| 7,114,404 B2 | 10/2006 | Sandhu et al. |
| 7,114,677 B2 | 10/2006 | Formon et al. |
| 7,129,886 B2 | 10/2006 | Hall et al. |
| 7,158,077 B2 | 1/2007 | Brosche |
| 7,161,359 B2 | 1/2007 | Denen et al. |
| 7,177,725 B2 | 2/2007 | Nortier et al. |
| 7,178,543 B2 | 2/2007 | Adams |
| 7,182,288 B2 | 2/2007 | Denen et al. |
| 7,182,289 B2 | 2/2007 | Moody et al. |
| 7,199,747 B2 | 4/2007 | Jenkins et al. |
| 7,213,782 B2 | 5/2007 | Osborne et al. |
| 7,228,874 B2 | 6/2007 | Bolderheij et al. |
| 7,232,111 B2 | 6/2007 | McDaniel et al. |
| 7,237,744 B2 | 7/2007 | Morris et al. |
| 7,247,140 B2 | 7/2007 | Ophardt |
| 7,253,541 B2 | 8/2007 | Kovarik et al. |
| 7,255,128 B2 | 8/2007 | Sandhu et al. |
| 7,255,325 B2 | 8/2007 | Muderlak |
| 7,255,714 B2 | 8/2007 | Malek |
| 7,262,607 B2 | 8/2007 | Champion et al. |
| 7,278,624 B2 | 10/2007 | Iott et al. |
| 7,282,818 B2 | 10/2007 | Kovarik |
| 7,296,765 B2 | 11/2007 | Rodrian |
| 7,304,569 B2 | 12/2007 | Marcichow |
| 7,341,170 B2 | 3/2008 | Boone |
| 7,370,824 B1 | 5/2008 | Osborne |
| 7,383,721 B2 | 6/2008 | Parsons et al. |
| 7,387,274 B2 | 6/2008 | Moody et al. |
| 7,396,000 B2 | 7/2008 | Parsons et al. |
| 7,432,847 B2 | 10/2008 | Fedotov et al. |

(56) References Cited

U.S. PATENT DOCUMENTS

| | | |
|---|---|---|
| 7,437,778 B2 | 10/2008 | Parsons et al. |
| D580,024 S | 11/2008 | Gilbert |
| 7,448,553 B2 | 11/2008 | Schmitt |
| 7,458,520 B2 | 12/2008 | Belz et al. |
| 7,475,827 B2 | 1/2009 | Schmitt |
| D586,428 S | 2/2009 | Carlsson et al. |
| 7,503,338 B2 | 3/2009 | Harrington et al. |
| 7,516,939 B2 | 4/2009 | Bailey |
| 7,537,195 B2 | 5/2009 | McDaniel et al. |
| 7,549,436 B2 | 6/2009 | Parsons et al. |
| 7,570,067 B2 | 8/2009 | Denen et al. |
| 7,584,898 B2 | 9/2009 | Schmitt et al. |
| D605,260 S | 12/2009 | Allard |
| 7,624,664 B2 | 12/2009 | Morris et al. |
| 7,651,068 B2 | 1/2010 | Bailey |
| 7,657,045 B2 | 2/2010 | Hochmair et al. |
| 7,690,395 B2 | 4/2010 | Jonte et al. |
| 7,690,623 B2 | 4/2010 | Parsons et al. |
| 7,698,980 B2 | 4/2010 | Morris et al. |
| 7,731,154 B2 | 6/2010 | Parsons et al. |
| 7,766,026 B2 | 8/2010 | Boey |
| 7,793,882 B2 | 9/2010 | Reinsel et al. |
| 7,819,136 B1 | 10/2010 | Eddy |
| 7,845,593 B2 | 12/2010 | Formon et al. |
| 7,878,446 B2 | 2/2011 | Reinsel et al. |
| 7,907,082 B2 | 3/2011 | Antonsson et al. |
| 7,908,920 B2 | 3/2011 | Champion et al. |
| 7,913,938 B2 | 3/2011 | Cooper |
| 7,921,480 B2 | 4/2011 | Parsons et al. |
| 7,931,228 B2 | 4/2011 | Omdoll |
| 7,963,475 B2 | 6/2011 | Rodrian |
| 7,971,368 B2 | 7/2011 | Fukaya et al. |
| 7,979,928 B2 | 7/2011 | Allen et al. |
| RE42,840 E | 10/2011 | Todoroki et al. |
| 8,028,355 B2 | 10/2011 | Reeder et al. |
| 8,037,551 B2 | 10/2011 | Wilson et al. |
| 8,065,758 B1 | 11/2011 | Mendez |
| D653,309 S | 1/2012 | Starck |
| 8,089,473 B2 | 1/2012 | Koottungal |
| 8,104,113 B2 | 1/2012 | Rodenbeck et al. |
| 8,104,431 B2 | 1/2012 | Klenotiz |
| 8,113,483 B2 | 2/2012 | Bayley et al. |
| 8,118,240 B2 | 2/2012 | Rodenbeck et al. |
| 8,127,782 B2 | 3/2012 | Jonte et al. |
| 8,127,967 B1 | 3/2012 | Beachy |
| 8,132,592 B2 | 3/2012 | Harrington et al. |
| 8,132,778 B2 | 3/2012 | Connors |
| 8,149,107 B2 | 4/2012 | Richards et al. |
| 8,154,411 B2 | 4/2012 | Richards et al. |
| 8,162,236 B2 | 4/2012 | Rodenbeck et al. |
| 8,171,578 B2 | 5/2012 | Tsujita et al. |
| 8,174,443 B2 | 5/2012 | Markus et al. |
| 8,186,551 B2 | 5/2012 | Morris et al. |
| 8,201,288 B2 | 6/2012 | Thomason et al. |
| D663,016 S | 7/2012 | Figurski et al. |
| 8,232,909 B2 | 7/2012 | Kroeger et al. |
| 8,234,724 B2 | 8/2012 | Wilson et al. |
| 8,243,040 B2 | 8/2012 | Koottungal |
| 8,267,328 B2 | 9/2012 | Pohl et al. |
| 8,274,036 B2 | 9/2012 | Weigen |
| 8,276,878 B2 | 10/2012 | Parsons et al. |
| 8,296,875 B2 | 10/2012 | Loberger et al. |
| 8,333,361 B2 | 12/2012 | McTargett |
| 8,353,321 B2 | 1/2013 | Agam et al. |
| 8,353,677 B2 | 1/2013 | Thompson et al. |
| 8,363,867 B2 | 1/2013 | Hochmair et al. |
| 8,364,546 B2 | 1/2013 | Yenni et al. |
| 8,365,767 B2 | 2/2013 | Davidson et al. |
| 8,376,313 B2 | 2/2013 | Burke et al. |
| 8,407,827 B1 * | 4/2013 | Friedman ............ E03C 1/186 4/623 |
| 8,413,952 B2 | 4/2013 | Lang et al. |
| 8,427,372 B2 | 4/2013 | Sakai et al. |
| 8,430,118 B2 | 4/2013 | Xiong |
| 8,434,172 B2 | 5/2013 | Nowak et al. |
| 8,438,672 B2 | 5/2013 | Reeder et al. |
| 8,469,056 B2 | 6/2013 | Marty et al. |
| 8,482,409 B2 | 7/2013 | Sawaski |
| 8,496,025 B2 | 7/2013 | Parsons et al. |
| 8,519,883 B2 | 8/2013 | Drake et al. |
| D689,595 S | 9/2013 | Georgeson |
| 8,528,579 B2 | 9/2013 | Jonte et al. |
| 8,544,785 B2 | 10/2013 | Pelland et al. |
| 8,545,461 B2 | 10/2013 | Thomason et al. |
| 8,556,228 B2 | 10/2013 | Marcichow et al. |
| 8,560,268 B2 | 10/2013 | Smithson |
| 8,561,225 B2 | 10/2013 | Wilson et al. |
| 8,561,626 B2 | 10/2013 | Sawaski et al. |
| 8,565,900 B2 | 10/2013 | Hochmair et al. |
| 8,572,772 B2 | 11/2013 | Wolf et al. |
| 8,612,057 B2 | 12/2013 | Murata et al. |
| 8,613,419 B2 | 12/2013 | Rodenbeck et al. |
| 8,615,821 B2 | 12/2013 | Funari |
| D697,589 S | 1/2014 | Georgeson |
| 8,635,717 B2 | 1/2014 | Wilson et al. |
| 8,683,624 B1 | 4/2014 | Zhadanov et al. |
| 8,684,297 B2 | 4/2014 | Moody et al. |
| 8,686,344 B2 | 4/2014 | Weigen |
| 8,695,125 B2 | 4/2014 | Funari et al. |
| 8,698,333 B2 | 4/2014 | Glasser et al. |
| 8,700,924 B2 | 4/2014 | Mian et al. |
| D705,902 S | 5/2014 | Yang et al. |
| D706,399 S | 6/2014 | Yang et al. |
| 8,739,815 B2 | 6/2014 | Harrington et al. |
| D708,714 S | 7/2014 | Georgeson |
| D709,166 S | 7/2014 | Yu |
| 8,776,817 B2 | 7/2014 | Sawaski et al. |
| 8,784,068 B2 | 7/2014 | Thompson et al. |
| 8,784,390 B2 | 7/2014 | Thomason et al. |
| 8,790,319 B2 | 7/2014 | Thomason et al. |
| D711,544 S | 8/2014 | Soltesz-Nagy |
| 8,807,521 B2 | 8/2014 | Dunki-Jacobs et al. |
| 8,812,357 B2 | 8/2014 | Hughes |
| D712,560 S | 9/2014 | Soltesz-Nagy |
| D713,508 S | 9/2014 | Downey et al. |
| D713,510 S | 9/2014 | Downey et al. |
| D713,940 S | 9/2014 | Georgeson |
| 8,827,240 B2 | 9/2014 | Chen |
| 8,844,564 B2 | 9/2014 | Jonte et al. |
| 8,857,786 B2 | 10/2014 | Bayley et al. |
| 8,863,774 B2 | 10/2014 | Wang |
| 8,887,323 B2 | 11/2014 | Oberholzer et al. |
| 8,892,495 B2 | 11/2014 | Hoffberg et al. |
| 8,920,391 B2 | 12/2014 | Thomason et al. |
| 8,922,369 B2 | 12/2014 | Sawaski |
| RE45,373 E | 2/2015 | Allen et al. |
| 8,944,105 B2 | 2/2015 | Rodenbeck et al. |
| 8,950,019 B2 | 2/2015 | Loberger et al. |
| 8,955,822 B2 | 2/2015 | Parsons et al. |
| D723,662 S | 3/2015 | Downey |
| 8,984,679 B2 | 3/2015 | Bayley et al. |
| 8,997,271 B2 | 4/2015 | Bayley |
| 9,020,202 B2 | 4/2015 | Belz |
| 9,032,564 B2 | 5/2015 | Reeder et al. |
| 9,032,565 B2 | 5/2015 | Loeck et al. |
| 9,057,182 B1 | 6/2015 | Friedman et al. |
| 9,057,183 B2 | 6/2015 | Chen |
| 9,062,790 B2 | 6/2015 | Esche et al. |
| 9,066,638 B2 | 6/2015 | Lowery et al. |
| 9,074,698 B2 | 7/2015 | Esche et al. |
| 9,079,748 B2 | 7/2015 | Tracey et al. |
| 9,139,985 B2 | 9/2015 | Lum et al. |
| 9,139,987 B2 | 9/2015 | Bedolla et al. |
| 9,169,626 B2 | 10/2015 | Guler et al. |
| 9,170,148 B2 | 10/2015 | Bayley et al. |
| 9,175,458 B2 | 11/2015 | Meehan et al. |
| 9,188,487 B2 | 11/2015 | Zhevelev et al. |
| 9,194,110 B2 | 11/2015 | Frick et al. |
| 9,228,329 B2 | 1/2016 | Rodenbeck et al. |
| 9,243,391 B2 | 1/2016 | Jonte et al. |
| 9,243,392 B2 | 1/2016 | Marty et al. |
| 9,243,756 B2 | 1/2016 | Davidson et al. |
| 9,243,904 B2 | 1/2016 | Lee et al. |
| 9,267,736 B2 | 2/2016 | Bayley et al. |

(56) References Cited

U.S. PATENT DOCUMENTS

| | | |
|---|---|---|
| 9,278,367 B2 | 3/2016 | Cooper |
| 9,285,807 B2 | 3/2016 | Rodenbeck et al. |
| 9,303,391 B2 | 4/2016 | Leichty et al. |
| 9,315,976 B2 | 4/2016 | Rodenbeck et al. |
| 9,322,151 B2 | 4/2016 | Janakiraman et al. |
| 9,341,278 B2 | 5/2016 | Esche |
| 9,347,209 B2 | 5/2016 | Wilson et al. |
| 9,394,675 B2 | 7/2016 | Sawaski et al. |
| D764,632 S | 8/2016 | Slothower |
| D764,633 S | 8/2016 | Slothower |
| D764,634 S | 8/2016 | Slothower |
| D764,635 S | 8/2016 | Slothower |
| D764,636 S | 8/2016 | Slothower |
| 9,441,885 B2 | 9/2016 | Bayley et al. |
| 9,464,423 B2 | 10/2016 | Dan et al. |
| D771,777 S | 11/2016 | Slothower |
| 9,499,965 B2 | 11/2016 | Wilson et al. |
| 9,526,380 B2 | 12/2016 | Hamilton et al. |
| 9,534,360 B2 | 1/2017 | Toivonen et al. |
| 9,551,137 B2 | 1/2017 | Chen |
| 9,578,994 B2 | 2/2017 | Capp et al. |
| 9,598,847 B2 | 3/2017 | Marcichow et al. |
| D788,269 S | 5/2017 | Kor |
| 9,657,464 B2 | 5/2017 | Dunki-Jacobs et al. |
| 9,657,471 B2 | 5/2017 | Denzin et al. |
| 9,661,958 B2 | 5/2017 | Moody et al. |
| D788,884 S | 6/2017 | Ziemann et al. |
| 9,695,579 B2 | 7/2017 | Herbert et al. |
| 9,695,580 B2 | 7/2017 | Esche et al. |
| 9,715,238 B2 | 7/2017 | Rodenbeck et al. |
| 9,726,779 B2 | 8/2017 | Krapf et al. |
| 9,756,992 B2 | 9/2017 | Osborne, Jr. |
| 9,758,951 B2 | 9/2017 | Evans et al. |
| 9,758,953 B2 | 9/2017 | Bayley et al. |
| 9,763,393 B2 | 9/2017 | Parsons et al. |
| 9,783,964 B2 | 10/2017 | Thompson et al. |
| D802,326 S | 11/2017 | Beaver |
| 9,816,257 B2 | 11/2017 | Blake et al. |
| 9,822,514 B2 | 11/2017 | Parsons et al. |
| 9,822,902 B2 | 11/2017 | Esche et al. |
| 9,828,751 B2 | 11/2017 | Parikh et al. |
| 9,834,918 B2 | 12/2017 | Veros et al. |
| 9,840,832 B2 | 12/2017 | Seggio et al. |
| 9,856,634 B2 | 1/2018 | Rodenbeck et al. |
| 9,907,441 B2 | 3/2018 | Osborne et al. |
| 9,910,578 B2 | 3/2018 | Freier et al. |
| 9,911,312 B2 | 3/2018 | Wildman et al. |
| 9,921,657 B2 | 3/2018 | Sprenger et al. |
| 9,938,703 B2 | 4/2018 | Wu et al. |
| 9,943,194 B2 | 4/2018 | Lightner et al. |
| 9,988,797 B2 | 6/2018 | Reeder et al. |
| 10,041,236 B2 | 8/2018 | Loberger et al. |
| 10,041,239 B2 | 8/2018 | Ahmady |
| 10,072,403 B2 | 9/2018 | Shirai et al. |
| 10,081,936 B2 | 9/2018 | Okubo et al. |
| 10,100,501 B2 | 10/2018 | Figurski et al. |
| 10,123,665 B2 | 11/2018 | Osborne, Jr. |
| 10,125,478 B2 | 11/2018 | Loeck et al. |
| 10,136,769 B2 | 11/2018 | Osborne et al. |
| 10,136,776 B2 | 11/2018 | Tanogashira et al. |
| 10,180,204 B2 | 1/2019 | Tracey et al. |
| 10,221,554 B2 | 3/2019 | Veros et al. |
| 10,233,621 B2 | 3/2019 | Park |
| 10,235,865 B2 | 3/2019 | Thyroff |
| 10,246,858 B2 | 4/2019 | Wawrla et al. |
| 10,253,486 B2 | 4/2019 | Plas et al. |
| 10,260,653 B2 | 4/2019 | Esche et al. |
| 10,267,025 B2 | 4/2019 | Tanogashira et al. |
| 10,273,669 B2 | 4/2019 | Esche et al. |
| 10,280,605 B2 | 5/2019 | Hall et al. |
| 10,287,760 B2 | 5/2019 | Sawaski et al. |
| 10,301,801 B2 | 5/2019 | Sawaski |
| 10,332,382 B2 | 6/2019 | Thyroff |
| 10,333,642 B2 | 6/2019 | Mian et al. |
| 10,344,461 B2 | 7/2019 | Maercovich |
| 10,369,578 B2 | 8/2019 | Allard |
| 10,385,553 B2 | 8/2019 | Dunki-Jacobs et al. |
| D860,674 S | 9/2019 | Young et al. |
| 10,430,737 B2 | 10/2019 | Yenni et al. |
| 10,458,565 B2 | 10/2019 | Esche |
| 10,460,215 B2 | 10/2019 | Herold et al. |
| 10,467,509 B2 | 11/2019 | Albadawi et al. |
| 10,467,510 B2 | 11/2019 | Albadawi et al. |
| 10,473,227 B2 | 11/2019 | Gross et al. |
| 10,478,027 B2 | 11/2019 | Tsujita et al. |
| 10,480,165 B2 | 11/2019 | Reeder et al. |
| 10,486,179 B2 | 11/2019 | Miller et al. |
| 10,487,486 B2 | 11/2019 | Funari et al. |
| 10,489,038 B2 | 11/2019 | Klicpera |
| 10,496,905 B2 | 12/2019 | Solomon et al. |
| 10,508,423 B2 | 12/2019 | Herbert et al. |
| 10,519,640 B2 | 12/2019 | Tanimoto et al. |
| 10,519,642 B2 | 12/2019 | Main et al. |
| 10,534,441 B2 | 1/2020 | Eijkelenboom |
| 10,558,228 B1 | 2/2020 | Chavez et al. |
| 10,563,879 B2 | 2/2020 | Yamaji |
| D878,080 S | 3/2020 | Young et al. |
| 10,579,912 B2 | 3/2020 | Holtmann |
| 10,605,906 B2 | 3/2020 | Todoroki |
| 10,621,478 B2 | 4/2020 | Albadawi et al. |
| 10,628,714 B2 | 4/2020 | Pradeep et al. |
| 10,648,163 B2 | 5/2020 | Blake et al. |
| 10,663,938 B2 | 5/2020 | Rexach et al. |
| 10,675,573 B2 | 6/2020 | Miller et al. |
| 10,697,160 B2 | 6/2020 | Loberger et al. |
| 10,698,429 B2 | 6/2020 | Rodenbeck et al. |
| 10,718,104 B2 | 7/2020 | Slothower |
| 10,718,105 B2 | 7/2020 | Chung |
| 10,753,489 B2 | 8/2020 | Hatakeyama et al. |
| 10,767,354 B2 | 9/2020 | Tracy |
| 10,767,356 B2 | 9/2020 | Maercovich |
| 10,794,050 B2 | 10/2020 | Shinohara et al. |
| 10,816,658 B2 | 10/2020 | Frizzell |
| 10,817,760 B2 | 10/2020 | Pradeep et al. |
| D903,050 S | 11/2020 | Ando et al. |
| 10,822,784 B2 | 11/2020 | Schomburg et al. |
| 10,829,918 B2 | 11/2020 | Ortolan et al. |
| 10,831,281 B2 | 11/2020 | Yang et al. |
| 10,837,161 B2 | 11/2020 | Loeck et al. |
| 10,856,704 B2 | 12/2020 | Burgo et al. |
| 10,870,412 B2 | 12/2020 | Zorin et al. |
| 10,870,973 B2 | 12/2020 | Gibson |
| 10,874,266 B2 | 12/2020 | Childress |
| D908,195 S | 1/2021 | Mo |
| 10,887,125 B2 | 1/2021 | Rexach et al. |
| 10,891,596 B2 | 1/2021 | Ophardt et al. |
| 10,900,577 B2 | 1/2021 | Christenson |
| 10,920,404 B2 | 2/2021 | Hirsch |
| D913,438 S | 3/2021 | Levi |
| 10,934,695 B2 | 3/2021 | Warsowe |
| 10,941,548 B2 | 3/2021 | Sawaski |
| 10,948,100 B2 | 3/2021 | Mariano |
| 10,948,101 B2 | 3/2021 | Morrish et al. |
| 10,993,587 B2 | 5/2021 | Ophardt et al. |
| 10,994,844 B2 | 5/2021 | Young |
| 11,017,655 B2 | 5/2021 | Harman et al. |
| 11,093,554 B2 | 8/2021 | Rexach et al. |
| 11,099,540 B2 | 8/2021 | Bradley et al. |
| D930,791 S | 9/2021 | Williams et al. |
| D931,989 S | 9/2021 | Mo |
| 11,118,338 B2 | 9/2021 | Schibur et al. |
| 11,129,502 B1 | 9/2021 | Jalbert |
| 11,161,730 B1 | 11/2021 | Volftsun et al. |
| 11,172,791 B2 | 11/2021 | Ophardt |
| 11,221,680 B1 | 1/2022 | Clements |
| 11,227,481 B1 | 1/2022 | Bran et al. |
| 11,739,510 B2 * | 8/2023 | Gibson .............. E03C 1/18 4/623 |
| 2003/0127542 A1 | 7/2003 | Cooper |
| 2003/0168489 A1 | 9/2003 | Formon et al. |
| 2003/0194283 A1 | 10/2003 | Kovarik et al. |
| 2003/0202851 A1 | 10/2003 | Kovarik |
| 2003/0222779 A1 | 12/2003 | Schotz et al. |
| 2004/0011716 A1 | 1/2004 | Sandt et al. |

(56) References Cited

U.S. PATENT DOCUMENTS

| | | |
|---|---|---|
| 2004/0021599 A1 | 2/2004 | Hall et al. |
| 2004/0046571 A1 | 3/2004 | Champion et al. |
| 2004/0046572 A1 | 3/2004 | Champion et al. |
| 2004/0059508 A1 | 3/2004 | Champion |
| 2004/0063231 A1 | 4/2004 | Sandhu et al. |
| 2004/0073186 A1 | 4/2004 | Cameron |
| 2004/0090361 A1 | 5/2004 | Brosche |
| 2004/0124981 A1 | 7/2004 | Moldavsky et al. |
| 2004/0134924 A1 | 7/2004 | Hansen et al. |
| 2004/0135688 A1 | 7/2004 | Zhevelev et al. |
| 2004/0160234 A1 | 8/2004 | Denen et al. |
| 2004/0221899 A1 | 11/2004 | Parsons et al. |
| 2004/0231723 A1 | 11/2004 | Harrington et al. |
| 2004/0255605 A1 | 12/2004 | Correa Junior et al. |
| 2005/0027208 A1 | 2/2005 | Shiraishi et al. |
| 2005/0062004 A1 | 3/2005 | Parsons et al. |
| 2005/0072874 A1 | 4/2005 | Denen et al. |
| 2005/0076425 A1 | 4/2005 | Contadini |
| 2005/0078029 A1 | 4/2005 | Okamura et al. |
| 2005/0083199 A1 | 4/2005 | Hall et al. |
| 2005/0114992 A1 | 6/2005 | Todoroki et al. |
| 2005/0133100 A1 | 6/2005 | Bolderheij et al. |
| 2005/0133754 A1 | 6/2005 | Parsons et al. |
| 2005/0134497 A1 | 6/2005 | Mafune et al. |
| 2005/0150992 A1 | 7/2005 | Morris et al. |
| 2005/0151101 A1 | 7/2005 | McDaniel et al. |
| 2005/0171709 A1 | 8/2005 | Nortier et al. |
| 2005/0205817 A1 | 9/2005 | Marcichow et al. |
| 2005/0253102 A1 | 11/2005 | Boilen |
| 2005/0270221 A1 | 12/2005 | Fedotov et al. |
| 2005/0279865 A1 | 12/2005 | Thomason et al. |
| 2005/0280532 A1 | 12/2005 | Moldavsky et al. |
| 2005/0281957 A1 | 12/2005 | Cooper et al. |
| 2005/0283207 A1 | 12/2005 | Hochmair et al. |
| 2006/0006354 A1 | 1/2006 | Guler et al. |
| 2006/0010591 A1 | 1/2006 | Bush |
| 2006/0014843 A1 | 1/2006 | Tanaka et al. |
| 2006/0041197 A1 | 2/2006 | Ophardt |
| 2006/0054733 A1 | 3/2006 | Moody et al. |
| 2006/0071673 A1 | 4/2006 | Lang |
| 2006/0080765 A1 | 4/2006 | Olshausen |
| 2006/0096020 A1 | 5/2006 | Caudilo et al. |
| 2006/0096021 A1 | 5/2006 | Hutchings |
| 2006/0118039 A1 | 6/2006 | Cooper |
| 2006/0124779 A1 | 6/2006 | Cooper |
| 2006/0124780 A1 | 6/2006 | Cooper |
| 2006/0124883 A1 | 6/2006 | Bailey |
| 2006/0175341 A1 | 8/2006 | Rodrian |
| 2006/0218762 A1 | 10/2006 | Sandhu et al. |
| 2006/0219031 A1 | 10/2006 | Sandhu et al. |
| 2006/0223204 A1 | 10/2006 | Sandhu et al. |
| 2006/0231638 A1 | 10/2006 | Belz et al. |
| 2006/0231782 A1 | 10/2006 | Iott et al. |
| 2006/0236513 A1 | 10/2006 | Sandhu et al. |
| 2006/0237673 A1 | 10/2006 | Muderlak |
| 2006/0237674 A1 | 10/2006 | Iott et al. |
| 2006/0250293 A1 | 11/2006 | Jenkins et al. |
| 2006/0278836 A1 | 12/2006 | Vincent |
| 2006/0289819 A1 | 12/2006 | Parsons et al. |
| 2007/0029435 A1 | 2/2007 | Moody et al. |
| 2007/0030145 A1 | 2/2007 | Marcichow |
| 2007/0034258 A1 | 2/2007 | Parsons et al. |
| 2007/0044840 A1 | 3/2007 | Ball |
| 2007/0057215 A1 | 3/2007 | Parsons et al. |
| 2007/0063158 A1 | 3/2007 | Parsons et al. |
| 2007/0069169 A1 | 3/2007 | Lin |
| 2007/0101489 A1 | 5/2007 | Hutchings |
| 2007/0156260 A1 | 7/2007 | Rodenbeck et al. |
| 2007/0158359 A1 | 7/2007 | Rodrian |
| 2007/0194167 A1 | 8/2007 | Denen et al. |
| 2007/0200078 A1 | 8/2007 | Parsons et al. |
| 2007/0235672 A1 | 10/2007 | McDaniel et al. |
| 2007/0246550 A1 | 10/2007 | Rodenbeck et al. |
| 2007/0246671 A1 | 10/2007 | Marcichow et al. |
| 2007/0272019 A1 | 11/2007 | Agam et al. |
| 2008/0005833 A1 | 1/2008 | Bayley et al. |
| 2008/0014830 A1 | 1/2008 | Sosnovskiy et al. |
| 2008/0048143 A1 | 2/2008 | Gassman et al. |
| 2008/0072369 A1 | 3/2008 | Funari et al. |
| 2008/0072965 A1 | 3/2008 | Buechel et al. |
| 2008/0078019 A1 | 4/2008 | Allen et al. |
| 2008/0087758 A1 | 4/2008 | Formon et al. |
| 2008/0087856 A1 | 4/2008 | Wilson et al. |
| 2008/0100495 A1 | 5/2008 | Richards et al. |
| 2008/0100496 A1 | 5/2008 | Richards et al. |
| 2008/0190982 A1 | 8/2008 | Omdoll |
| 2008/0196151 A1 | 8/2008 | Oakes Jr. |
| 2008/0209622 A1 | 9/2008 | Wood et al. |
| 2008/0223951 A1 | 9/2008 | Tracey et al. |
| 2008/0263889 A1 | 10/2008 | Fukaya et al. |
| 2009/0031493 A1 | 2/2009 | Tsujita et al. |
| 2009/0049599 A1 | 2/2009 | Parsons et al. |
| 2009/0056011 A1 | 3/2009 | Wolf et al. |
| 2009/0077730 A1 | 3/2009 | Funari |
| 2009/0077736 A1 | 3/2009 | Loberger et al. |
| 2009/0113614 A1 | 5/2009 | Yuen |
| 2009/0119142 A1 | 5/2009 | Yenni et al. |
| 2009/0119832 A1 | 5/2009 | Conroy |
| 2009/0145219 A1 | 6/2009 | Champion et al. |
| 2009/0160659 A1 | 6/2009 | Bailey |
| 2009/0167590 A1 | 7/2009 | Antonsson et al. |
| 2009/0241248 A1 | 10/2009 | Vollmar et al. |
| 2009/0261282 A1 | 10/2009 | Connors |
| 2009/0276272 A1 | 11/2009 | Hughes |
| 2009/0293192 A1 | 12/2009 | Pons |
| 2009/0300379 A1 | 12/2009 | Mian et al. |
| 2009/0311914 A1 | 12/2009 | Weigen |
| 2009/0314857 A1 | 12/2009 | Thomason et al. |
| 2010/0044604 A1 | 2/2010 | Burke et al. |
| 2010/0078459 A1 | 4/2010 | Reinsel et al. |
| 2010/0089939 A1 | 4/2010 | Morris et al. |
| 2010/0104121 A1 | 4/2010 | Hochmair et al. |
| 2010/0109934 A1 | 5/2010 | Drake et al. |
| 2010/0122745 A1 | 5/2010 | Thomason et al. |
| 2010/0129557 A1 | 5/2010 | Thomason et al. |
| 2010/0132112 A1 | 6/2010 | Bayley et al. |
| 2010/0138988 A1 | 6/2010 | Holmes |
| 2010/0145529 A1 | 6/2010 | Thomason et al. |
| 2010/0175625 A1 | 7/2010 | Klenotiz |
| 2010/0180367 A1 | 7/2010 | Elsener et al. |
| 2010/0200789 A1 | 8/2010 | Connors |
| 2010/0266776 A1 | 10/2010 | Cooper et al. |
| 2010/0269248 A1 | 10/2010 | Nowak et al. |
| 2010/0269923 A1 | 10/2010 | Parsons et al. |
| 2010/0277371 A1 | 11/2010 | Markus et al. |
| 2010/0291847 A1 | 11/2010 | Thomason et al. |
| 2010/0294641 A1 | 11/2010 | Kunkel |
| 2010/0300555 A1 | 12/2010 | Lum et al. |
| 2010/0305885 A1 | 12/2010 | Ganapathy et al. |
| 2010/0327201 A1 | 12/2010 | Xiong |
| 2011/0000559 A1 | 1/2011 | Murata et al. |
| 2011/0006075 A1 | 1/2011 | Toivonen et al. |
| 2011/0017930 A1 | 1/2011 | Marcichow et al. |
| 2011/0071698 A1 | 3/2011 | Glasser et al. |
| 2011/0081256 A1 | 4/2011 | Thompson et al. |
| 2011/0084880 A1 | 4/2011 | Sakai et al. |
| 2011/0114187 A1 | 5/2011 | Sawaski |
| 2011/0133010 A1 | 6/2011 | Pelland et al. |
| 2011/0139282 A1 | 6/2011 | Loeck et al. |
| 2011/0148309 A1 | 6/2011 | Reid et al. |
| 2011/0202019 A1 | 8/2011 | Cooper et al. |
| 2011/0289675 A1 | 12/2011 | Dunki-Jacobs et al. |
| 2011/0294712 A1 | 12/2011 | Joshi |
| 2012/0178764 A1 | 7/2012 | Bonnert et al. |
| 2012/0182175 A1 | 7/2012 | Krapf et al. |
| 2012/0204337 A1 | 8/2012 | Pohler et al. |
| 2012/0228532 A1 | 9/2012 | Oberholzer et al. |
| 2012/0246815 A1 | 10/2012 | Lin et al. |
| 2012/0255619 A1 | 10/2012 | Librus et al. |
| 2013/0061381 A1 | 3/2013 | Parsons et al. |
| 2013/0147598 A1 | 6/2013 | Hoffberg et al. |
| 2013/0318699 A1 | 12/2013 | Ahmady |
| 2014/0022528 A1 | 1/2014 | Lee et al. |
| 2014/0069951 A1 | 3/2014 | Schmidt et al. |

(56) References Cited

U.S. PATENT DOCUMENTS

| | | | |
|---|---|---|---|
| 2014/0115772 A1 | 5/2014 | Janakiraman et al. |
| 2014/0123378 A1 | 5/2014 | Luettgen et al. |
| 2014/0161321 A1 | 6/2014 | Belz |
| 2014/0224338 A1 | 8/2014 | Maercovich |
| 2014/0259337 A1 | 9/2014 | Melvin et al. |
| 2014/0283291 A1 | 9/2014 | Austin |
| 2014/0358302 A1* | 12/2014 | Wu .................. G06F 3/017 700/282 |
| 2015/0000026 A1* | 1/2015 | Clements ........... G06F 3/04886 4/443 |
| 2015/0020298 A1 | 1/2015 | Hsu |
| 2015/0020299 A1 | 1/2015 | Hsu |
| 2015/0088282 A1 | 3/2015 | Fiedler et al. |
| 2015/0108380 A1 | 4/2015 | Huang et al. |
| 2015/0233100 A1 | 8/2015 | Loeck et al. |
| 2015/0268342 A1 | 9/2015 | Iott et al. |
| 2015/0277569 A1 | 10/2015 | Sprenger et al. |
| 2016/0040405 A1 | 2/2016 | Talsma et al. |
| 2016/0069057 A1 | 3/2016 | Okubo et al. |
| 2016/0083949 A1 | 3/2016 | Plas et al. |
| 2016/0220079 A1 | 8/2016 | Abir et al. |
| 2016/0312453 A1 | 10/2016 | Wu et al. |
| 2016/0340879 A1 | 11/2016 | Chen |
| 2017/0009435 A1 | 1/2017 | Burns |
| 2017/0014007 A1 | 1/2017 | Ros Marin |
| 2017/0051481 A1 | 2/2017 | Mercer |
| 2017/0068228 A1 | 3/2017 | Schoenbeck et al. |
| 2017/0132885 A1 | 5/2017 | Schneider et al. |
| 2017/0215655 A1* | 8/2017 | Ophardt ............. G06F 3/04842 |
| 2017/0231442 A1 | 8/2017 | Tsujita et al. |
| 2017/0241118 A1 | 8/2017 | Denzin et al. |
| 2017/0254054 A1 | 9/2017 | Dunki-Jacobs et al. |
| 2017/0268209 A1 | 9/2017 | Guidish et al. |
| 2017/0275863 A1 | 9/2017 | Tanogashira et al. |
| 2017/0276781 A1 | 9/2017 | Todoroki |
| 2017/0298608 A1 | 10/2017 | Maercovich |
| 2018/0010322 A1 | 1/2018 | Grover et al. |
| 2018/0055297 A1 | 3/2018 | Tanogashira et al. |
| 2018/0080673 A1 | 3/2018 | Yamaji |
| 2018/0112379 A1 | 4/2018 | Wawrla et al. |
| 2018/0172173 A1 | 6/2018 | Gross et al. |
| 2018/0216329 A1 | 8/2018 | Tanimoto et al. |
| 2018/0232563 A1 | 8/2018 | Albadawi et al. |
| 2018/0291600 A1* | 10/2018 | Beck .................. G06F 3/017 |
| 2018/0328011 A1 | 11/2018 | Chen |
| 2019/0003163 A1 | 1/2019 | Loeck et al. |
| 2019/0010682 A1 | 1/2019 | Wright |
| 2019/0010689 A1 | 1/2019 | Hall et al. |
| 2019/0012898 A1 | 1/2019 | Wittrup |
| 2019/0069730 A1 | 3/2019 | Ophardt et al. |
| 2019/0203453 A1 | 7/2019 | Lipinski et al. |
| 2019/0368175 A1 | 12/2019 | Abood |
| 2020/0087905 A1 | 3/2020 | Reeder et al. |
| 2020/0130843 A1 | 4/2020 | Young |
| 2020/0206752 A1 | 7/2020 | Wu et al. |
| 2020/0210263 A1 | 7/2020 | Lavrentyev et al. |
| 2020/0248438 A1 | 8/2020 | Wang et al. |
| 2020/0291627 A9 | 9/2020 | Horwitz et al. |
| 2020/0323397 A1 | 10/2020 | Simonovsky |
| 2020/0326734 A1 | 10/2020 | Rodenbeck et al. |
| 2020/0378094 A1 | 12/2020 | Dauleh |
| 2020/0397936 A1 | 12/2020 | Deros et al. |
| 2020/0407962 A1 | 12/2020 | Luettgen et al. |
| 2020/0412343 A1 | 12/2020 | Semanson et al. |
| 2021/0017743 A1 | 1/2021 | Alcantara Talavera |
| 2021/0032852 A1 | 2/2021 | Loeck et al. |
| 2021/0045589 A1 | 2/2021 | Burgo et al. |
| 2021/0047818 A1 | 2/2021 | Schomburg et al. |
| 2021/0059481 A1 | 3/2021 | Bai |
| 2021/0059482 A1 | 3/2021 | Bai |
| 2021/0071775 A1 | 3/2021 | Morrish et al. |
| 2021/0081054 A1 | 3/2021 | Yang et al. |
| 2021/0090033 A1 | 3/2021 | Ophardt et al. |
| 2021/0164203 A1 | 6/2021 | Mavinahally et al. |
| 2021/0180713 A1 | 6/2021 | Mariano |
| 2021/0191432 A1 | 6/2021 | Wilson et al. |
| 2021/0203520 A1 | 7/2021 | Rexach et al. |
| 2021/0207354 A1 | 7/2021 | Kuru et al. |
| 2021/0229114 A1 | 7/2021 | Trefren |
| 2021/0235942 A1 | 8/2021 | Ophardt et al. |
| 2021/0235943 A1 | 8/2021 | Ophardt et al. |
| 2021/0241603 A1 | 8/2021 | Harman et al. |
| 2021/0267424 A1 | 9/2021 | Chung et al. |
| 2021/0274980 A1 | 9/2021 | Nyanin |
| 2021/0321829 A1 | 10/2021 | Shell et al. |
| 2021/0333699 A1 | 10/2021 | Peel et al. |
| 2021/0333772 A1 | 10/2021 | Bradley et al. |
| 2021/0340744 A1 | 11/2021 | Alintoff |
| 2021/0348367 A1 | 11/2021 | Swarte et al. |
| 2021/0353801 A1 | 11/2021 | Weisenberg |
| 2021/0355668 A1 | 11/2021 | Luettgen et al. |
| 2021/0357454 A1 | 11/2021 | Rexach et al. |
| 2021/0362994 A1 | 11/2021 | Booher |
| 2021/0363738 A1 | 11/2021 | Timsit et al. |
| 2021/0363741 A1 | 11/2021 | Schibur et al. |
| 2021/0372103 A1 | 12/2021 | Cannon |
| 2021/0388585 A1 | 12/2021 | Hamilton et al. |
| 2021/0388592 A1 | 12/2021 | Luettgen et al. |
| 2022/0001044 A1 | 1/2022 | Burd |
| 2022/0002137 A1 | 1/2022 | Carone et al. |
| 2022/0008591 A1 | 1/2022 | Smith |
| 2022/0008592 A1 | 1/2022 | Smith |
| 2022/0008593 A1 | 1/2022 | Smith |
| 2022/0011243 A1 | 1/2022 | Smith |
| 2022/0056681 A1 | 2/2022 | Firchau et al. |
| 2022/0056682 A1 | 2/2022 | Massa |
| 2022/0068077 A1 | 3/2022 | Mims et al. |
| 2022/0307245 A1* | 9/2022 | Kinicki .................. H04L 12/282 |
| 2022/0325509 A1* | 10/2022 | Blizzard .................. E03C 1/057 |
| 2023/0337808 A1* | 10/2023 | Abreu Calfa .......... E03D 5/105 |

FOREIGN PATENT DOCUMENTS

| | | |
|---|---|---|
| CN | 2217044 Y | 1/1996 |
| CN | 1259655 A | 7/2000 |
| CN | 1269016 A | 10/2000 |
| CN | 1350610 A | 5/2002 |
| CN | 2515288 Y | 10/2002 |
| CN | 2651312 Y | 10/2004 |
| CN | 1560808 A | 1/2005 |
| CN | 101317075 B | 12/2008 |
| CN | 201195874 Y | 2/2009 |
| CN | 101548054 A | 9/2009 |
| CN | 100552152 C | 10/2009 |
| CN | 101592924 A | 12/2009 |
| CN | 201395837 Y | 2/2010 |
| CN | 101680213 B | 3/2010 |
| CN | 101793050 A | 8/2010 |
| CN | 201891204 U | 7/2011 |
| CN | 202235069 U | 5/2012 |
| CN | 102656325 B | 9/2012 |
| CN | 103806518 A | 5/2014 |
| CN | 203627979 U | 6/2014 |
| CN | 104677591 A | 6/2015 |
| CN | 103806518 B | 9/2015 |
| CN | 204911852 U | 12/2015 |
| CN | 105256864 B | 1/2016 |
| CN | 104677591 B | 3/2017 |
| CN | 107044158 A | 8/2017 |
| CN | 203795558 U | 8/2017 |
| CN | 206616755 U | 11/2017 |
| CN | 107761879 A | 3/2018 |
| CN | 207640863 U | 7/2018 |
| CN | 108374462 A | 8/2018 |
| CN | 208041266 U | 11/2018 |
| CN | 109415892 A | 3/2019 |
| CN | 208650177 U | 3/2019 |
| CN | 109989463 A | 7/2019 |
| CN | 110234438 A | 9/2019 |
| CN | 210002509 U | 1/2020 |
| CN | 107761879 B | 2/2020 |
| CN | 108374462 B | 7/2020 |
| CN | 111851660 A | 10/2020 |
| DE | 14 82 696 A1 | 4/1969 |

(56) References Cited

FOREIGN PATENT DOCUMENTS

| | | |
|---|---|---|
| DE | 16 58 243 A1 | 9/1970 |
| DE | 28 53 981 A1 | 6/1980 |
| DE | 30 08 025 A1 | 9/1981 |
| DE | 39 20 581 A1 | 1/1991 |
| DE | 19608157 A1 | 7/1997 |
| DE | 19712222 A1 | 10/1997 |
| DE | 10157975 B4 | 11/2008 |
| DE | 10 2015 011 386 A1 | 3/2017 |
| DE | 10 2018 118 393 A1 | 1/2020 |
| EP | 0 251 498 A2 | 1/1988 |
| EP | 0 251 498 A3 | 6/1989 |
| EP | 0 353 183 A1 | 1/1990 |
| EP | 0 623 710 A1 | 11/1994 |
| EP | 0 628 666 A2 | 12/1994 |
| EP | 0 783 058 A2 | 7/1997 |
| EP | 0 783 058 A3 | 10/1997 |
| EP | 0 995 127 A1 | 4/2000 |
| EP | 0 995 127 B1 | 11/2002 |
| EP | 1 378 612 A1 | 1/2004 |
| EP | 1 530 061 A2 | 5/2005 |
| EP | 1 378 612 B1 | 3/2006 |
| EP | 1 530 061 A3 | 4/2006 |
| EP | 1 816 270 A2 | 8/2007 |
| EP | 2 208 831 A1 | 7/2010 |
| EP | 1 816 270 B1 | 12/2013 |
| EP | 2 207 937 B1 | 3/2014 |
| EP | 2 207 937 B8 | 6/2014 |
| EP | 2 513 383 A1 | 10/2014 |
| EP | 2 519 833 B1 | 8/2015 |
| EP | 2 902 813 A4 | 7/2016 |
| EP | 3 248 523 A2 | 11/2017 |
| EP | 1 955 026 B1 | 10/2018 |
| EP | 3 418 851 A1 | 12/2018 |
| EP | 3 457 228 B1 | 3/2019 |
| EP | 3 508 659 A1 | 7/2019 |
| EP | 3 932 435 A1 | 1/2022 |
| EP | 3 939 933 A1 | 1/2022 |
| FR | 2881860 A1 | 8/2006 |
| FR | 3085977 A1 | 3/2020 |
| GB | 2 392 986 A | 3/2004 |
| GB | 2 392 986 B | 11/2005 |
| GB | 2 457 141 A | 8/2009 |
| GB | 2 537 961 A | 11/2016 |
| GB | 2 537 962 A | 11/2016 |
| IL | 158270 | 5/2004 |
| JP | H11-044703 A | 2/1999 |
| JP | 2000-017700 A | 1/2000 |
| JP | 2004-116148 A | 4/2004 |
| JP | 2009-215845 A | 9/2009 |
| JP | 2013-537439 A | 10/2013 |
| JP | 2021-123940 A | 8/2021 |
| KR | 100790820 B1 | 1/2008 |
| TW | 363151 B | 7/1999 |
| WO | WO-91/13370 A1 | 9/1991 |
| WO | WO-96/19737 A1 | 6/1996 |
| WO | WO-96/41058 A1 | 12/1996 |
| WO | WO-99/04283 A1 | 1/1999 |
| WO | WO-2004/061343 A1 | 7/2004 |
| WO | WO-2005/086560 A2 | 9/2005 |
| WO | WO-2005/086560 A3 | 5/2006 |
| WO | WO-2006/084978 A1 | 8/2006 |
| WO | WO-2006/137986 A1 | 12/2006 |
| WO | WO-2007/059051 A2 | 5/2007 |
| WO | WO-2007/062806 A1 | 6/2007 |
| WO | WO-2007/118791 A2 | 10/2007 |
| WO | WO-2007/118791 A3 | 12/2007 |
| WO | WO-2009/059587 A1 | 5/2009 |
| WO | WO-2010/028170 A2 | 3/2010 |
| WO | WO-2010/028170 A3 | 6/2010 |
| WO | WO-2011/075321 A1 | 6/2011 |
| WO | WO-2011/080688 A3 | 12/2011 |
| WO | WO-2012/151488 A1 | 11/2012 |
| WO | WO-2014/071227 A1 | 5/2014 |
| WO | WO-2014/088761 A1 | 6/2014 |
| WO | WO-2015/120213 A1 | 8/2015 |
| WO | WO-2015/148771 A1 | 10/2015 |
| WO | WO-2016/010454 A1 | 1/2016 |
| WO | WO-2018/009877 A1 | 1/2018 |
| WO | WO-2018/035460 A1 | 2/2018 |
| WO | WO-2018/118715 A1 | 6/2018 |
| WO | WO-2018/138329 A1 | 8/2018 |
| WO | WO-2018/164561 A1 | 9/2018 |
| WO | WO-2019/027923 A1 | 2/2019 |
| WO | WO-2020/024072 A1 | 2/2020 |
| WO | WO-2020/028798 A1 | 2/2020 |
| WO | WO-2020/081990 A3 | 4/2020 |
| WO | WO-2020/264231 A1 | 12/2020 |
| WO | WO-2021/050119 A1 | 3/2021 |
| WO | WO-2021/097169 A1 | 5/2021 |
| WO | WO-2021/104867 A1 | 6/2021 |
| WO | WO-2021/140375 A1 | 7/2021 |
| WO | WO-2021/194958 A1 | 9/2021 |
| WO | WO-2021/198870 A1 | 10/2021 |
| WO | WO-2021/207188 A1 | 10/2021 |
| WO | WO-2021/211166 A1 | 10/2021 |
| WO | WO-2021/221860 A1 | 11/2021 |
| WO | WO-2021/236712 A1 | 11/2021 |
| WO | WO-2021/237348 A1 | 12/2021 |
| WO | WO-2021/245645 A1 | 12/2021 |
| WO | WO-2021/260693 A1 | 12/2021 |

OTHER PUBLICATIONS amazon.com, Ideal Standard Idealrain Vertical Ceiling Arm, posted Apr. 19, 2013, [online], [visited Apr. 26, 2022]. Internet, <URL: https://www.amazon.co.uk/Ideal-Standard-Idealrain-B9446AA-Chrome-Plated/dp/B008DCTP7G/ref> (Year: 2013).

amazon.com, Luxury ceiling mounted basin sink spout, posted Jul. 30, 2020, [online], [visited Apr. 26, 2022]. Internet, <URL: https://www.amazon.com/Luxury-Ceiling-Mounted-Chrome-Bathrub/dp/B08DZCBDX1> (Year: 2020).

amazon.in, "Srm PAJ7620 Gesture Recognition Sensor", Internet URL: https://www.epsglobal.com/Media-Library/EPSGlobal/Products/files/pixart/PAJ7620F2.pdf?ext=.pdf, retrieved on Mar. 31, 2022 (6 pages).

Brizo Pascal, Obedient-Intelligent, brochure, 2007, 3 pages.

European Examination Report on EP Appl. Ser. No. 10791022.6 dated Apr. 23, 2015 (4 pages).

European Examination Report on EP Appl. Ser. No. 10791022.6 dated Aug. 27, 2014 (4 pages).

European Official Communication Summons Oral Proceedings on EP Appl. Ser. No. 10791022.6 dated May 17, 2016 (4 pages).

Extended European Search Report on EP Appl. Ser. No. 21171634.5 dated Nov. 22, 2021 (12 pages).

First Chinese Office Action on CN Appl. Ser. No. 201080057020.2 dated Jul. 25, 2013 (33 pages).

Gizmodo, "Ceiling-Mounted Bathroom Faucet Would be Great for Quick Showers", 2009. https://gizmodo.com/ceiling-mounted-bathroom-faucet-would-be-great-for-quic-5390931.

International Search Report on PCT Appl. Ser. No. PCT/US2010/058730 dated Jul. 3, 2011 (5 pages).

PixArt Imaging Inc., "PAJ7620F2 General Datasheet: Integrated Gesture Recognition Sensor", Internal URL: https://www.epsglobal.com/Media-Library/EPSGlobal/Products/files/pixart/PAJ7620F2.pdf?ext=.pdf, dated Mar. 29, 2016 (25 pages).

Second Chinese Office Action for CN Appl. Ser. No. 201080057020.2 dated Feb. 25, 2014 (19 pages).

STMicroelectronics, "Datasheet—Time-of-Flight 8x8 multizone ranging sensor with wide field of view", Internet URL: https://www.st.com/resource/en/datasheet/v/5315cx.pdf, dated Dec. 2021 (38 pages).

STMicroelectronics, "VL53L5CX—Time-of-Flight 8x8 multizone ranging sensor with wide field of view", Internet URL: https://www.st.com/content/st_com/en/campaigns/vl53l5cx-time-of-flight-sensor-multizone.html?ecmp=tt24055_gl_ps_nov2021&aw_kw=tof&aw_m=p&aw_c=15158713672&aw_tg=aud-1232809041753:kwd-333570818&aw_gclid=Cj0KCQjw29CRBhCUARIsAOboZblWreLZSpsl4t5D0RmM8tgQBsA5RE9d6J4AQwnZm3BYNtRyDbfPw

(56) References Cited

OTHER PUBLICATIONS iUaAp-AEALw_wcB&gclid=Cj0KCQjw29CRBhCUARIsAOboZblWreLZSpl4t5D0RmM8tgQBsA5RE9d6J4AQwnZm3BYNtRyDbfPwiUaAp-A.

Third Office Action for Chinese Application No. 201080057020.2, mail date Aug. 1, 2014, 14 pages.

youtube.com, "Ces 2022: Day 2 Highlights | Moen Smart Faucet with Motion Control Demo" Internet URL: https://www.youtube.com/watch?v=7ZAu5mXc1Ro, dated Jan. 7, 2022 (18 pages).

youtube.com, "Gesture-controlled in-ear headphones concept using radar and AI", Internet URL: https://www.youtube.com/watch?v=ZTyJz3yCjiM, dated Mar. 1, 2021 (20 pages).

youtube.com, Kohler's $6235 kitchen faucet hangs from your ceiling, posted Jan. 6, 2022, [online], [visited Apr. 26, 2022]. Internet, <URL: htpps:// www.youtube.com/watch?v=FsaXDVWLwg8> (Year: 2022).

"Optical Handbook vol. II", edited by Li Jingzhen, p. 2396, Shaanxi Science and Technology Publishing House, 1st edition.

Office Action issued in Chinese Appl. No. 202310398985.7 dated Jun. 17, 2025.

Office Action issued in Indian Appl. No. 202211022378 dated May 27, 2025.

\* cited by examiner

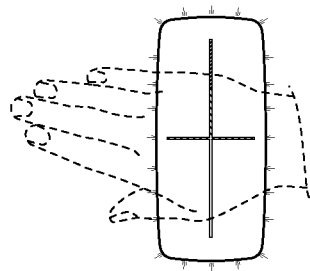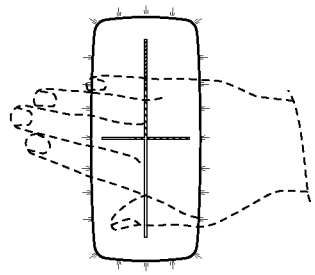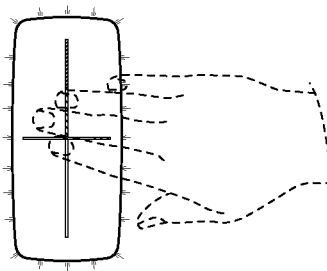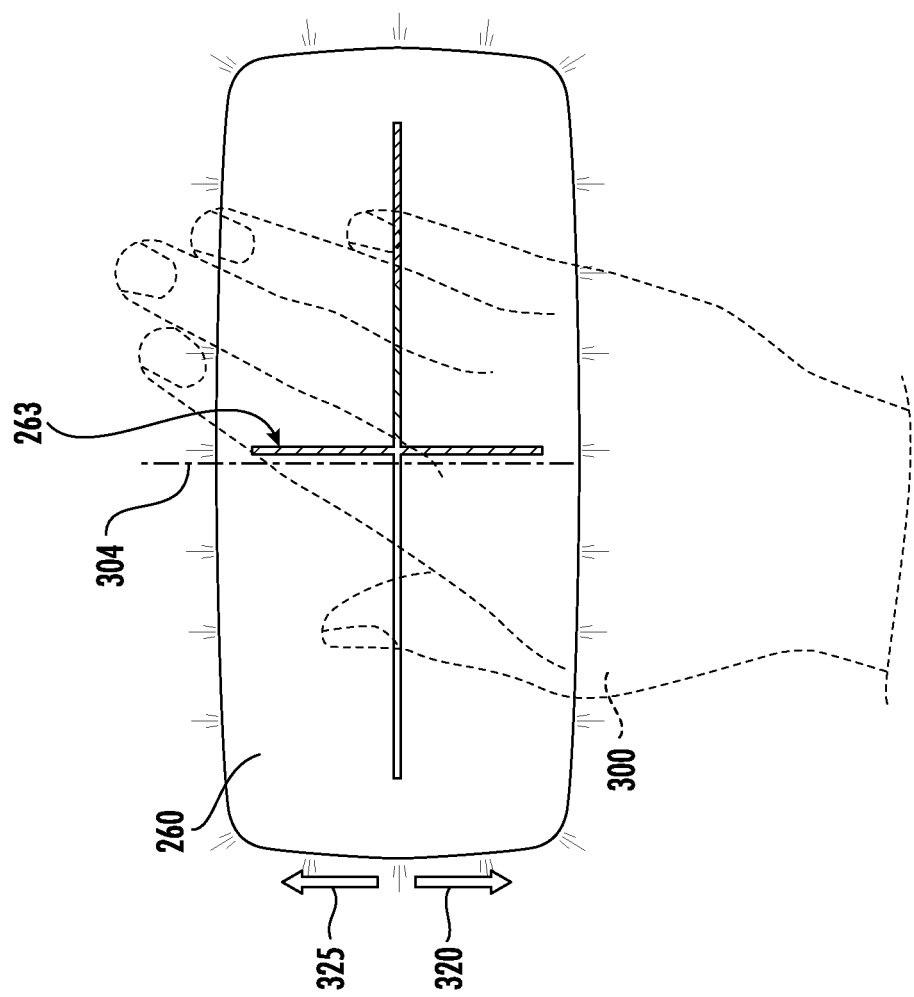

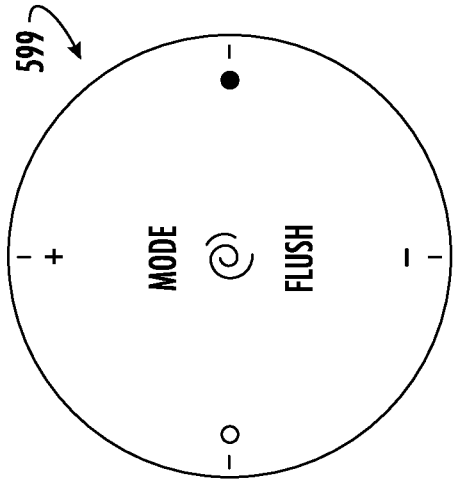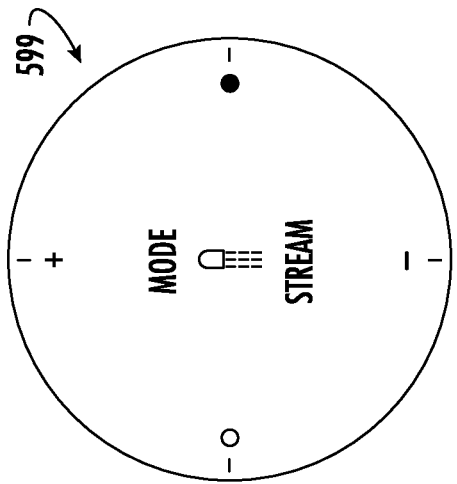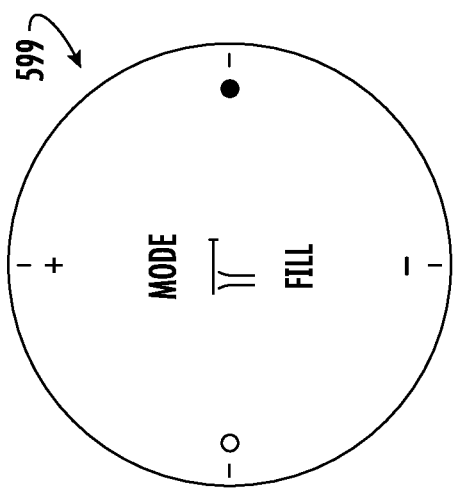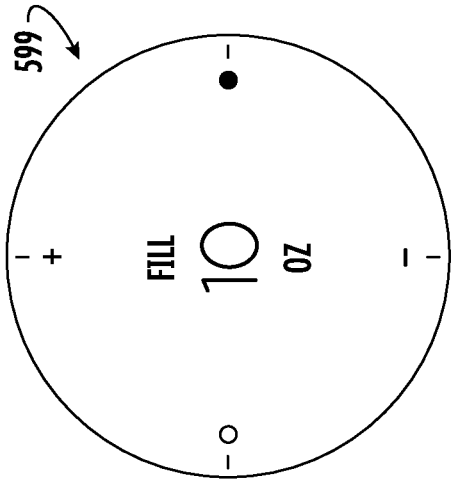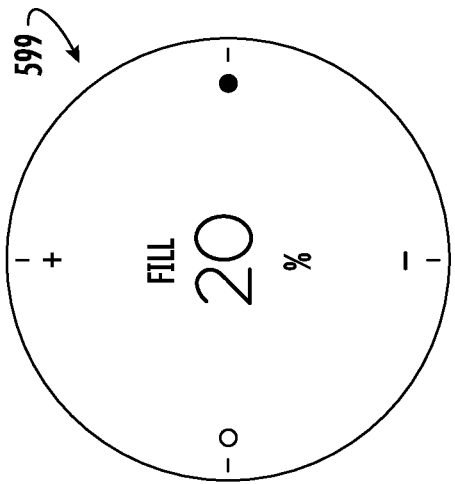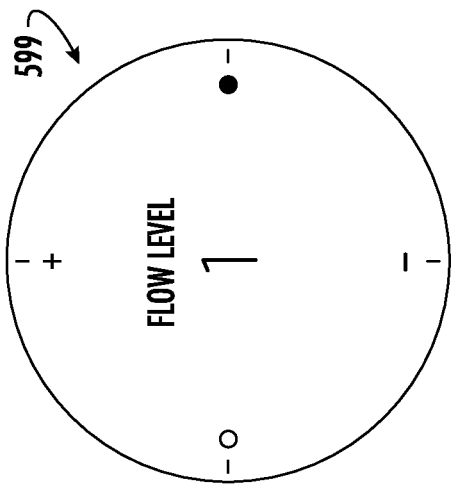

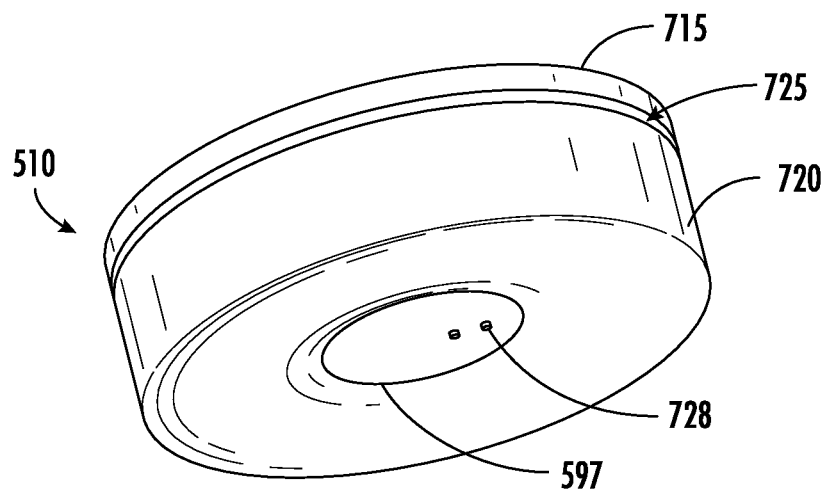
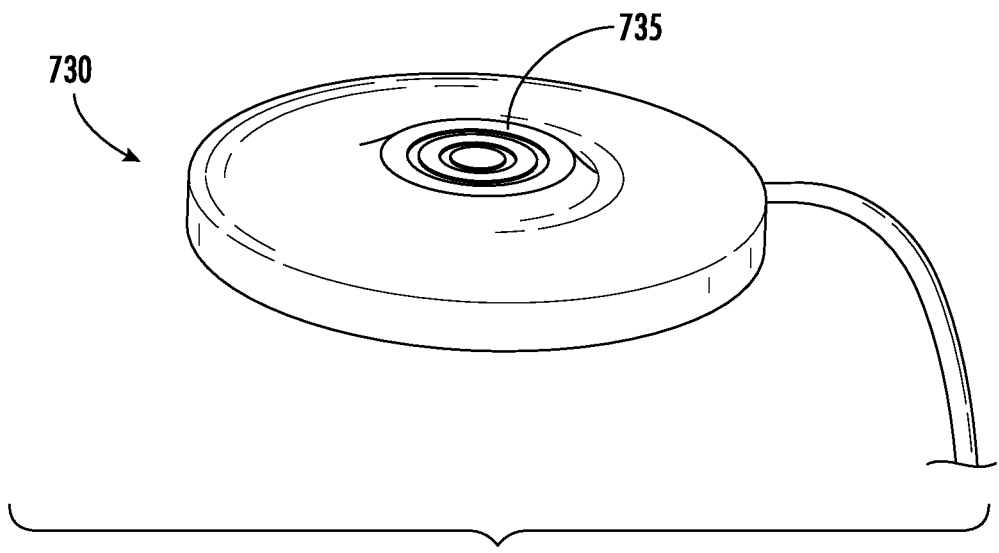
FIG. 17

TOUCHLESS PLUMBING CONTROL SYSTEM

CROSS-REFERENCE TO RELATED APPLICATIONS

This application claims the benefit of and priority to Indian Provisional Patent Application No. 202211022378, filed Apr. 14, 2022, the entire disclosure of which is incorporated by reference herein.

BACKGROUND

The present disclosure relates generally to control systems for plumbing structures. More particularly, the present disclosure relates to touchless plumbing control systems.

Faucets and similar plumbing fixtures typically include various knobs, levers, buttons, or other actuators requiring physical touch to control water flow therethrough. In some cases, the need to turn a knob, adjust a lever, or press a button can be prohibitive or cumbersome depending on a user's degree of dexterity, level of ability, and/or the dimensions/arrangement of the faucet.

Accordingly, it would be advantageous to provide a control system for a plumbing system or assembly that does not require a user to physically touch the control system.

SUMMARY

One aspect of the present disclosure relates to a control unit for a plumbing assembly. The control unit includes a first pair of sensors arranged along a first axis of the control unit, where the first pair of sensors is configured to determine a velocity of at least one gesture along a first dimension aligned with the first axis. The control unit also includes a second pair of sensors arranged a long a second axis of the control unit, where the second pair of sensors is configured to determine a velocity of the at least one gesture along a second dimension aligned with the second axis. The control unit also includes at least one controller operably coupled to the first pair of sensors, and the second pair of sensors, where the at least one controller is configured adjust at least one operational state of the plumbing assembly based on the velocity of the at least one gesture along the first dimension and the velocity of the gesture along the second dimension.

In various embodiments, at least one of the first pair of sensors or the second pair of sensors are time of flight (TOF) sensors. In some embodiments, the control unit further includes a gesture recognition sensor disposed between a first sensor and a second sensor of the first pair of sensors. In other embodiments, the gesture recognition sensor includes four directional diodes. In yet other embodiments, at least one of the first pair of sensors or the second pair of sensors are infrared sensors. In various embodiments, a first sensor of the first pair of sensors is disposed on a first side of the control unit, a second sensor of the first pair of sensors is disposed on a second side of the control unit, the second side being opposite the first side. Similarly, a first sensor of the second pair of sensors is disposed on a third side of the control unit and a second sensor of the second pair of sensors is disposed on a fourth side of the control unit, the fourth side being opposite the third side. In various embodiments, the at least one gesture includes a first gesture and a second gesture, and the at least one operational state comprises a first operational state and a second operational state, where the first gesture corresponds to the first operational state and the second gesture corresponds to the second operational state.

Another aspect of the present disclosure relates to a plumbing control system. The plumbing control system includes a control unit communicably coupled to the control assembly, where an input received by the control unit causes the control assembly to adjust at least one of a water flow or a water temperature through the plumbing assembly. The control assembly includes a first diverter and a second diverter respectively coupled to a first inlet and a second inlet. The control assembly further includes a first valve and a second valve disposed downstream of the first diverter and the second diverter, where at least one of the first valve or the second valve is configured to control an amount of water flowing through at least one of the first diverter or the second diverter. The control unit includes a first pair of sensors arranged along a first axis of the control unit, where the first pair of sensors is configured to determine a velocity of at least one gesture along a first dimension aligned with the first axis. The control unit further includes a second pair of sensors arranged a long a second axis of the control unit, where the second pair of sensors is configured to determine a velocity of the at least one gesture along a second dimension aligned with the second axis. The control unit also includes at least one controller operably coupled to the first pair of sensors and the second pair of sensors, where the at least one controller is configured adjust at least one operational state of at least one of the first valve or the second valve based on the velocity of the at least one gesture along the first dimension and the velocity of the at least one gesture along the second dimension.

In various embodiments, the at least one gesture includes a first gesture and a second gesture and the at least one operational state includes a first operational state and a second operational state, where the first gesture corresponds to the first operational state and the second gesture corresponds to the second operational state. In some embodiments, the first operational state corresponds to a first water flow and the second operational state corresponds to a second water flow. In other embodiments, the first operational state corresponds to a first water temperature and the second operational state corresponds to a second water temperature. In yet other embodiments, the first gesture is in a first direction and the second gesture is in a second direction opposite the first direction.

Yet another aspect of the present disclosure relates to a plumbing system. The plumbing system includes a plumbing assembly and a control assembly fluidly coupled to the plumbing assembly. The plumbing system further includes a hot water source, and a cold water source, where hot water enters the control assembly through a hot water inlet and cold water enters the control assembly through a cold water inlet. The plumbing system also includes a control unit communicably coupled to the control assembly, where an input received by the control unit causes the control assembly to adjust at least one of a water flow or a water temperature through the plumbing assembly. The control assembly includes a first diverter and a second diverter respectively coupled to the hot water inlet and the cold water inlet. The control assembly further includes a first valve fluidly coupled to the first diverter, where the first valve is configured to control a flow of hot water, and a second valve fluidly coupled to the second diverter, where the second valve is configured to control a flow of cold water. The first diverter and the second diverter, and the first valve and the second valve are arranged in parallel. The plumbing assembly is fluidly coupled downstream of both the first valve and the second valve. The control unit includes at least one sensor configured to receive an input based on at least one of a user presence or a user motion above the control unit, and the input causes a change in configuration of at least one of the first valve or the second valve.

In various embodiments, the at least one sensor includes a first pair of sensors, the first pair of sensors being arranged along a first axis. In some embodiments, the at least one sensor further includes a second pair of sensors, the second pair of sensors being arranged along a second axis, where the second axis is perpendicular to the first axis. In other embodiments, the user motion includes a gesture, where the first pair of sensors and the second pair of sensors are configured to measure a velocity of the gesture along the first axis and the second axis. In yet other embodiments, the control unit is a modular knob. In various embodiments, the modular knob includes an indicator, the indicator being circumferentially disposed about the modular knob and including at least one light source, where the indicator is configured to indicate an operational state of the control unit. In various embodiments, the modular knob includes a first portion and a second portion coupled to the first portion, where the first portion includes the at least one sensor and the second portion includes a power source. In some embodiments, the at least one light source is configured to change at least one of a brightness, intensity, or color based on the input.

This summary is illustrative only and should not be regarded as limiting.

BRIEF DESCRIPTION OF THE DRAWINGS

The disclosure will become more fully understood from the following detailed description, taken in conjunction with the accompanying figures, wherein like reference numerals refer to like elements.

FIGS. 8A-8D are top views of a user interacting with the control unit of FIG. 4, according to an exemplary embodiment.

FIGS. 15A-L show top views of the control unit of FIG. 11, illustrating a screen portion, according to various exemplary embodiments.

FIG. 17 is a perspective view of the control unit of FIG. 11 and a wireless charging unit configured for use with the control unit, according to an exemplary embodiment.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Figure 1:
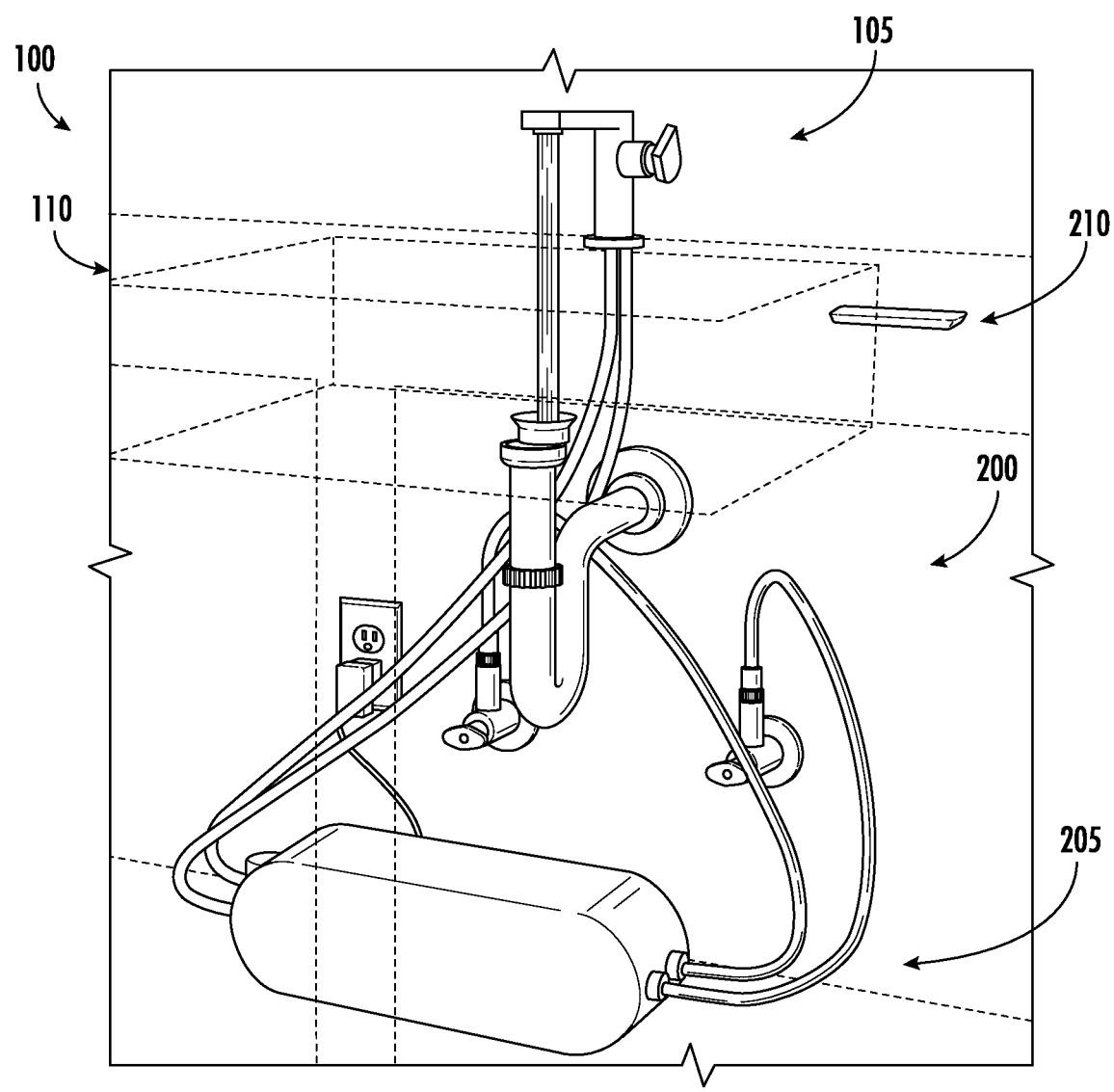
FIG. 1 is a schematic representation of a perspective view of a plumbing system, according to an exemplary embodiment.

Referring to FIG. 1, a plumbing system 100 is shown, according to an exemplary embodiment. The plumbing system 100 includes a plumbing assembly 105 configured to provide water to a receptacle 110 (e.g., sink basin, bathtub, shower area, etc.). Water through the plumbing assembly 105 may be fluidly coupled to and controlled by a plumbing control system 200. The control system 200 includes a control assembly 205, which is coupled to hot and cold water supplies and may be installed below or behind a surface upon which the plumbing assembly 105 is mounted (i.e., below deck). The control assembly 205 is communicably coupled to a control unit 210, which may be installed on or adjacent to the surface upon which the plumbing assembly 105 is mounted (i.e., above deck). The control unit 210 is configured to receive an input from a user without requiring the user to touch the control unit 210, wherein the input causes a change in configuration within the control assembly 205. The change in configuration within the control assembly 205 causes a change in configuration of the plumbing assembly 105 to adjust an amount and/or a temperature of water flowing through the plumbing assembly 105. In various embodiments, the plumbing assembly 105 also includes one or more manual controls including, but not limited to, one or more knobs, levers, buttons, or sliders, which may be operable to control the amount and/or temperature of water flowing through the plumbing assembly 105.

In various embodiments, the control assembly 205 may be coupled to the control unit 210 via a wired or wireless connection. In some embodiments, the control assembly 205 may be configured to receive inputs from the control unit 210 via Wi-Fi and/or Bluetooth. In various embodiments, the control system 200 may be integrally configured within the plumbing system 100. In other embodiments, the control system 200 may be separately configured and retrofit within the plumbing system 100. In various embodiments, the control assembly 205 may include a diverter system, which may be configured to toggle operation of the plumbing assembly 105 between an automatic control via the control unit 210 and a manual control via the manual controls. In various embodiments, the control unit 210 and/or the control assembly 205 may be communicably coupled to one or more devices (e.g., user devices, remotes), smart home artificial intelligence devices (e.g., Google Home, Echo, Alexa, etc.) to facilitate control of water through the plumbing assembly 105.

Figure 2:
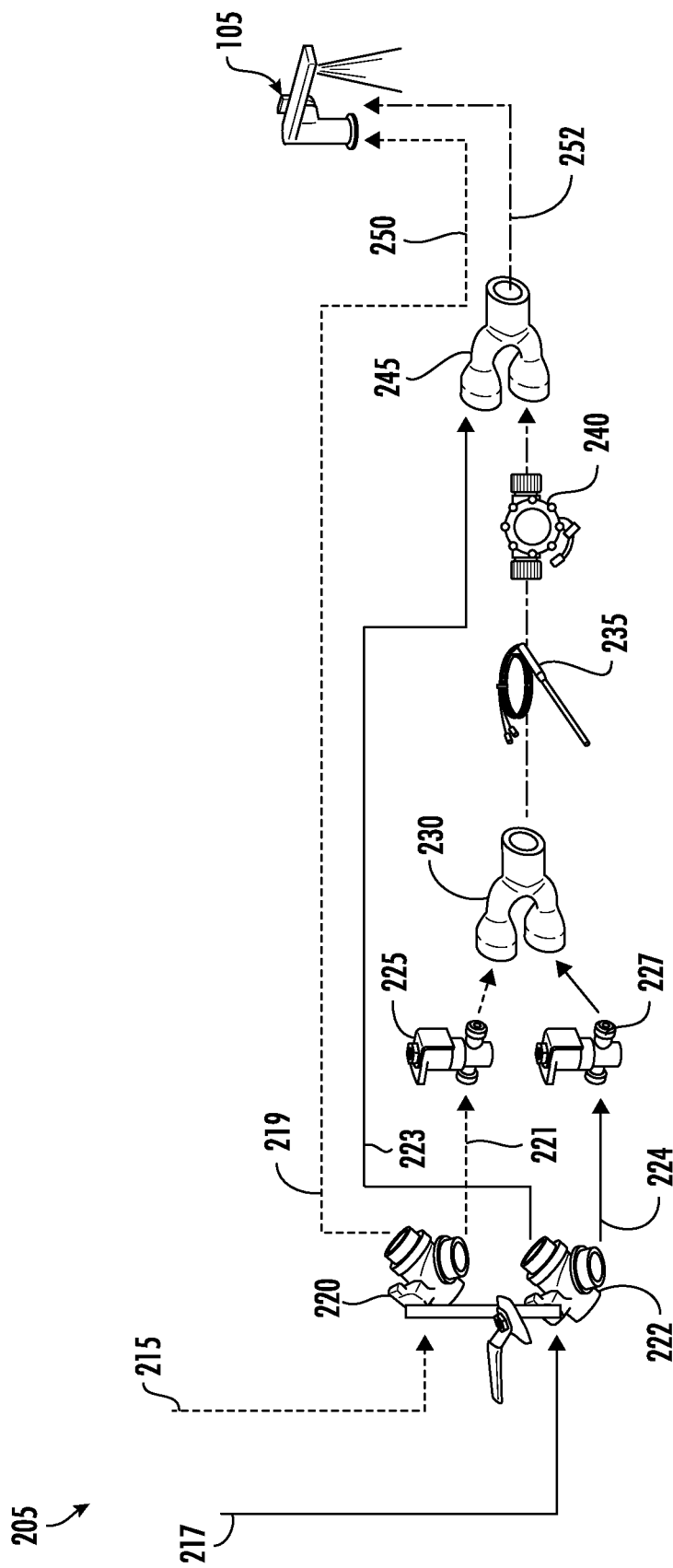
FIG. 2 is a schematic representation of a control assembly in a parallel configuration within the plumbing system of FIG. 1, according to an exemplary embodiment.

FIG. 2 shows a schematic representation of the control assembly 205 in a parallel configuration, according to an exemplary embodiment. As shown, water enters the control assembly 205 via a hot water inlet 215 and a cold water inlet 217. Hot water from the hot water inlet 215 then flows to a hot water diverter 220 and cold water from the cold water inlet 217 flows to a cold water diverter 222. When the control assembly 205 operates in a manual mode, water flows from the hot water diverter 220 in a first direction 219 such that the water goes directly to a hot water outlet 250 to be dispensed by the plumbing assembly 105. Similarly cold water flows from the cold water diverter 222 in a first direction 223, passes through a connector 245, and exits through a cold water outlet 252 to be dispensed by the plumbing assembly 105. A ratio of hot water to cold water and/or an amount of mixed water through the plumbing assembly 105 may then be adjusted manually by manipulating one or more knobs, levers, buttons, etc.

As shown in FIG. 2, when the control assembly 205 is operating in an automatic mode, hot water flows in a second direction 221 to a first valve and stepper motor 225, and cold water flows in a second direction 224 to a second valve and stepper motor 227. Because the control assembly 205 is a parallel configuration, the hot and cold water lines (i.e., water pathways between the hot and cold water inlets 215, 217 and the hot and cold water outlets 250, 252) are arranged substantially in parallel and both the first and second valve and stepper motors 225, 227 operate synchronously during flow regulation. However, during temperature control, the valve and stepper motors 225, 227 independently adjust to increase or decrease a flow of hot or cold water therethrough. As shown in FIG. 2, hot and cold water are received by a three-way connector 230 and flows toward the connector 245. In the water passageway disposed between the connectors 230 and 245, the control assembly 205 includes a thermocouple 235 and a flow meter 240 to respectively measure the temperature and flow rate of water passing through the control assembly 205. Accordingly, the control assembly 205 may control both the temperature and the flow rate of water by adjusting the valve and stepper motors 225, 227, which control flow through separate hot and cold water lines exiting the respective hot and cold diverts 220, 222.

Figure 3:
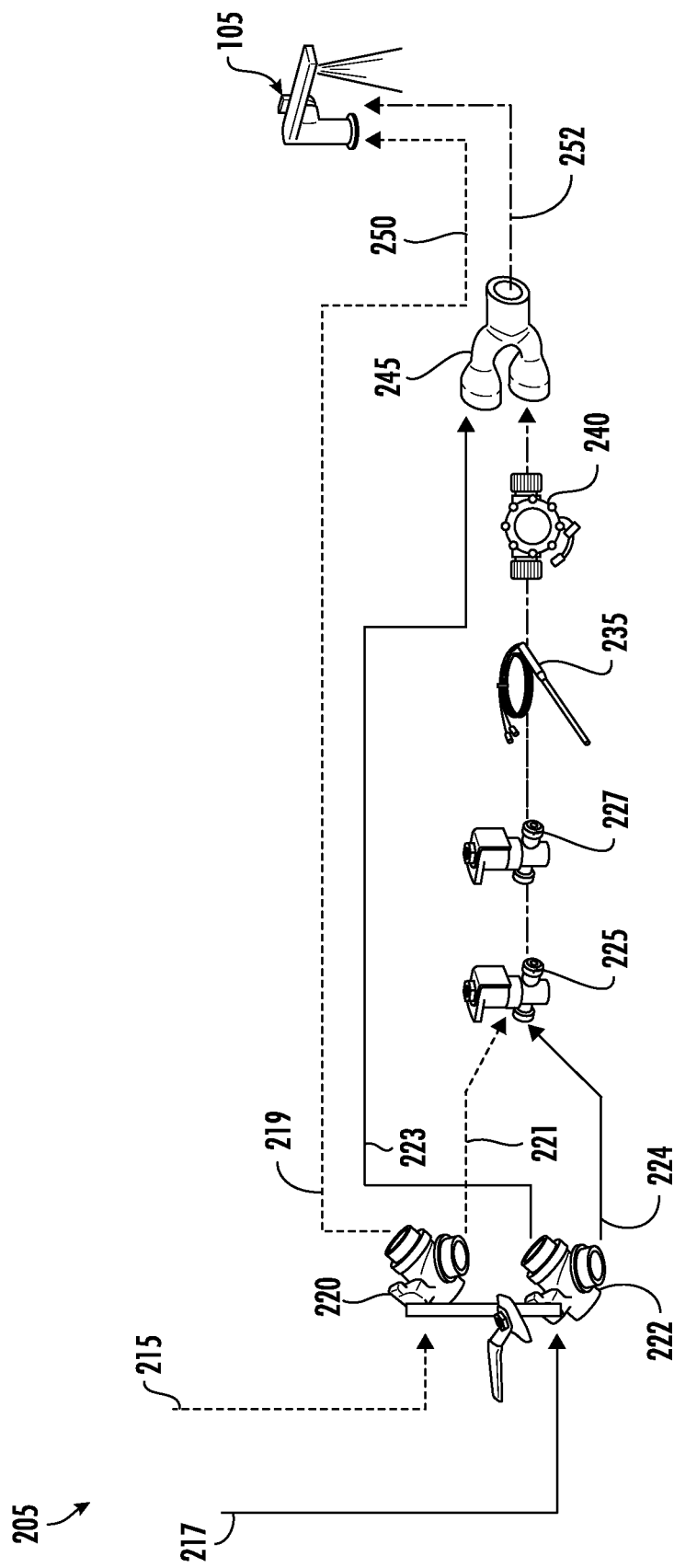
FIG. 3 is a schematic representation of a control assembly in a series configuration within the plumbing system of FIG. 1, according to an exemplary embodiment.

FIG. 3 shows the control assembly 205 in a series configuration, according to an exemplary embodiment. The series configuration of the control assembly 205 in a manual mode diverts water identically as the parallel configuration of the control assembly 205 in the manual mode. However, when in the automatic mode, the control assembly 205 may be configured such that hot and cold water (from hot and cold water inlets 215, 217) may exit the respective diverts 220 and 222 and mix first at the valve and stepper motor 225, wherein the valve and stepper motor 225 is a mixing valve configured to adjust a ratio of hot water to cold water. A flow of the mixed water may then be subsequently regulated by the valve and stepper motor 227 in the same line.

Figure 4:
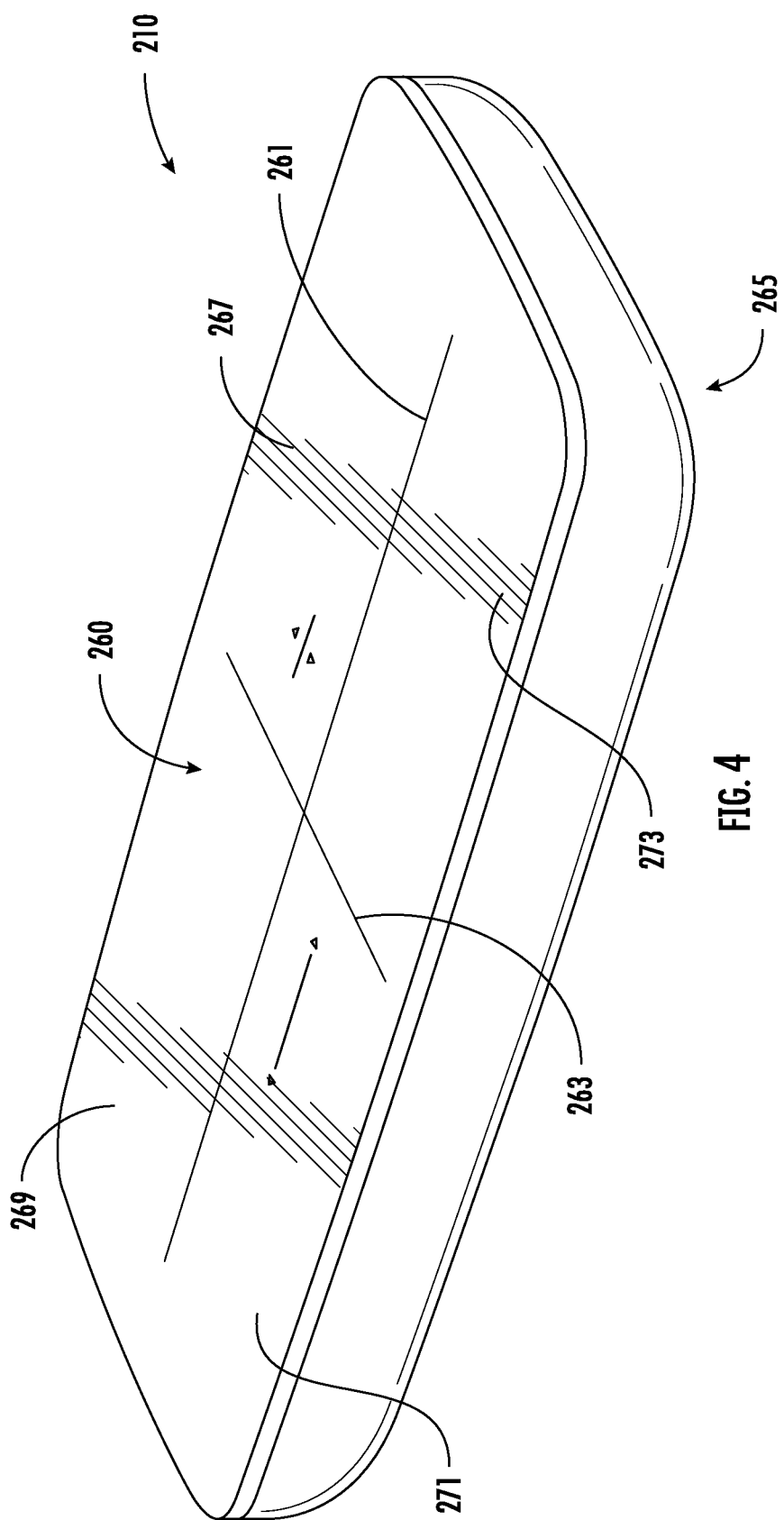
FIG. 4 is a perspective view of a control unit for the plumbing system of FIG. 1, according to an exemplary embodiment.

As described above, the control assembly 205 receives input from the control unit 210, which a user may interact with to change one or more operating conditions of the plumbing system 100. FIG. 4 shows a perspective view of the control unit 210, according to an exemplary embodiment. As shown, the control unit 210 incudes a sensory surface 260, which is mounted atop a housing 265. The sensory surface 260 may include various indicators (e.g., lights, light strips, illuminated lines or curves, etc.), which may illuminate in response to a user input. As shown in FIG. 4, the sensory surface 260 includes a first indicator 261 extending along a first axis of the sensory surface 260 and a second indicator 263 extending along a second axis, wherein the second axis is substantially perpendicular to the first axis (e.g., forming a cross pattern with a point of intersection at or near the center of the sensory surface 260). In various embodiments, the first indicator 261 and/or the second indicator 263 may include one or more light sources (e.g., LEDs) or may be disposed directly above one or more light sources, which illuminate the indicators 261, 263 in response to user input.

The sensory surface 260 also includes various sensory regions. As shown, the sensory surface 260 includes four regions 267, 269, 271, 273 which are arranged in quadrants. Each of the regions 267, 269, 271, 273 may be configured to display metrics associated with water flow through the plumbing assembly 105. For example, at least one of the regions 267, 269, 271, 273 may display a water temperature (i.e., as detected from the thermocouple 235), a water flow rate (i.e., as detected by the flow meter 240), an operational status of the control system 200, etc. In various embodiments, the operational status of the control system 200 may include an indication that the system 200 is in an ON state, wherein the control system 200 is operating in the automatic mode. The indication may also inform a user if the control system 200 is functioning normally or if one or more components are malfunctioning. The control unit 210 is configured to sense at least one of a user proximity or user movement in a region above the sensory surface 260 such that the user need not touch or contact the control unit 210 to cause a change in operation of the control assembly 205 and thus, a change in operation within the plumbing system 100.

Figure 5:
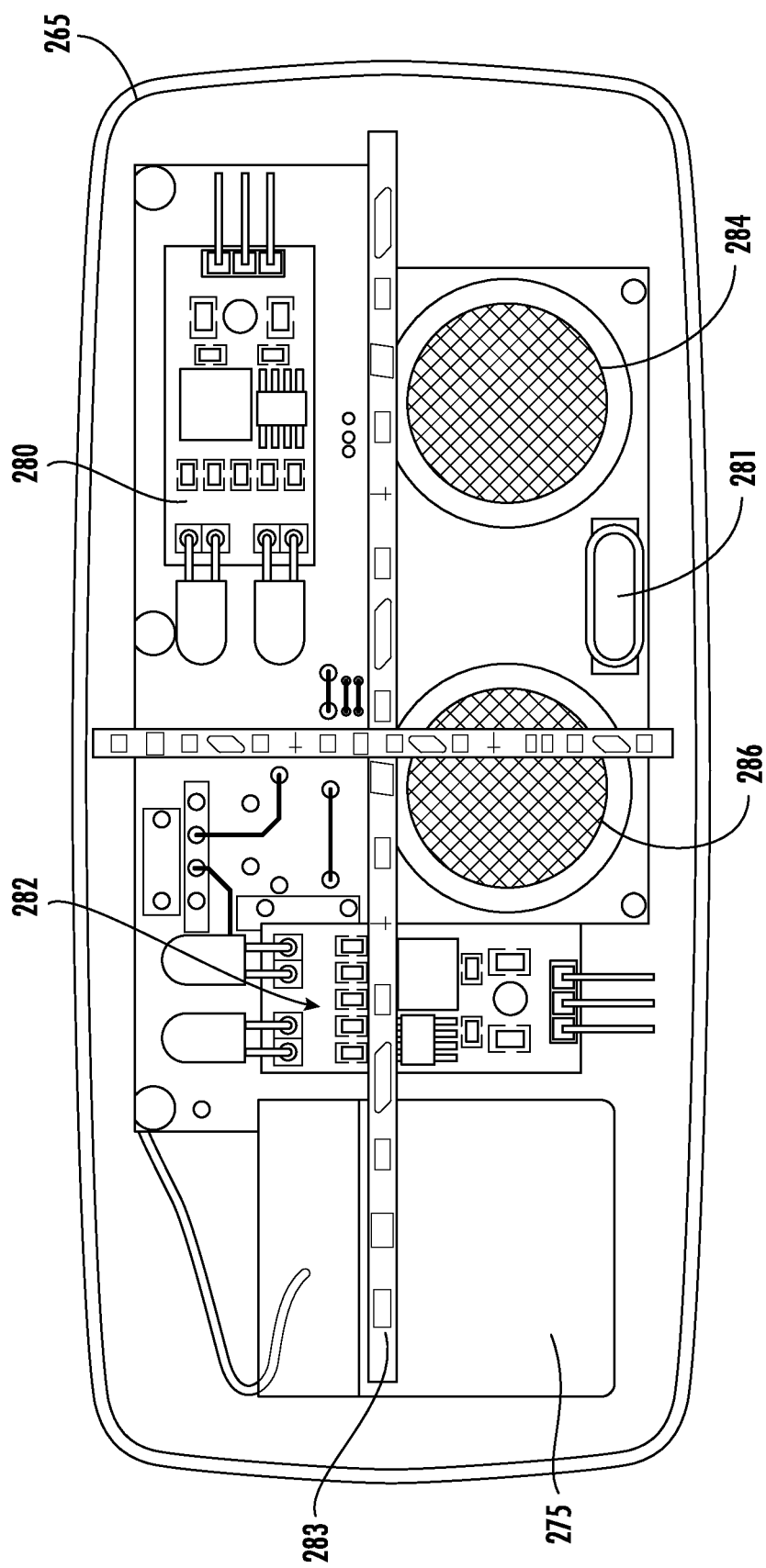
FIG. 5 is a top section view of the control unit of FIG. 4, according to an exemplary embodiment.

To sense user proximity and/or user movement above the sensory surface 260, the control unit 210 includes one or more sensors 281, 284, 286 disposed within the housing 265, as shown in FIG. 5. In various embodiments, the one or more sensors 281, 284, 286 may include at least one of an ultrasonic sensor, infrared (IR) sensor, heat sensor, vibration sensor, reflective sensor, time of flight sensor, or any other sensor type known in the art to sense at least one of proximity or movement of a user. In some embodiments, the control assembly 210 includes two IR sensors to detect presence of a user (i.e., a user's hand) and an ultrasonic sensor to gauge distance of the user (i.e., the user's hand) from the sensory surface 260. The one or more sensors 281, 284, 286 may be coupled to one or more controllers 280, 282, which may accumulate, process, and send inputs to the diverters 220, 222 and/or valve and step motor 225, 227 in response to inputs sensed by the sensors 281, 284, 286.

As shown, the control assembly 210 also includes one or more light sources 283, which may illuminate the indicators 261, 263 disposed on the sensory surface 260. In various embodiments, the one or more light sources may be multi-color LED lights. Finally, the control assembly 210 includes one or more power sources 275 (e.g., Lithium-ion battery), which supplies power to the sensors 281, 284, 286, the controllers 280, 282, and/or the light sources 283. In various embodiments, the power source 275 may be configured to wireless charge. In various embodiments, at least one of the sensory surface 260 or the housing 265 may be styled or customized by the user to conform to a particular aesthetic style or to resemble a particular medium (e.g., wood, glass, metal, fabric, etc.). In some embodiments, at least one of the sensory surface 260 or the housing 265 may be swapped or switched out to conform to a style preference of the user.

During use of the plumbing control system 200, the control unit 210 may be mounted within or adjacent to a surface upon which the pluming assembly 105 is mounted (e.g., a kitchen counter or surface, adjacent a sink, disposed within a wall of a shower area). The control unit 210 may be coupled to the control assembly 205, which may be disposed below or behind the surface upon which the plumbing assembly 105 is mounted (i.e., below deck). The control assembly 205 may be fluidly coupled to hot and cold water sources and fluidly coupled to the plumbing assembly 105 such that flow from the hot and cold water sources through the plumbing assembly 105 is controlled by the control assembly 205.

Figure 6B:
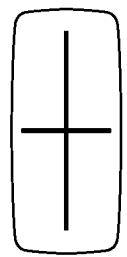
FIGS. 6A-6D are top views of a user interacting with the control unit of FIG. 4, according to an exemplary embodiment.
Figure 6C:
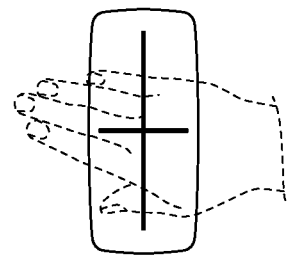
Figure 6D:
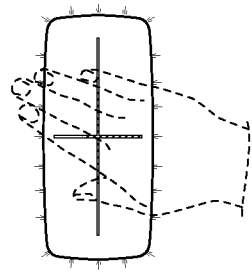
Figure 6A:
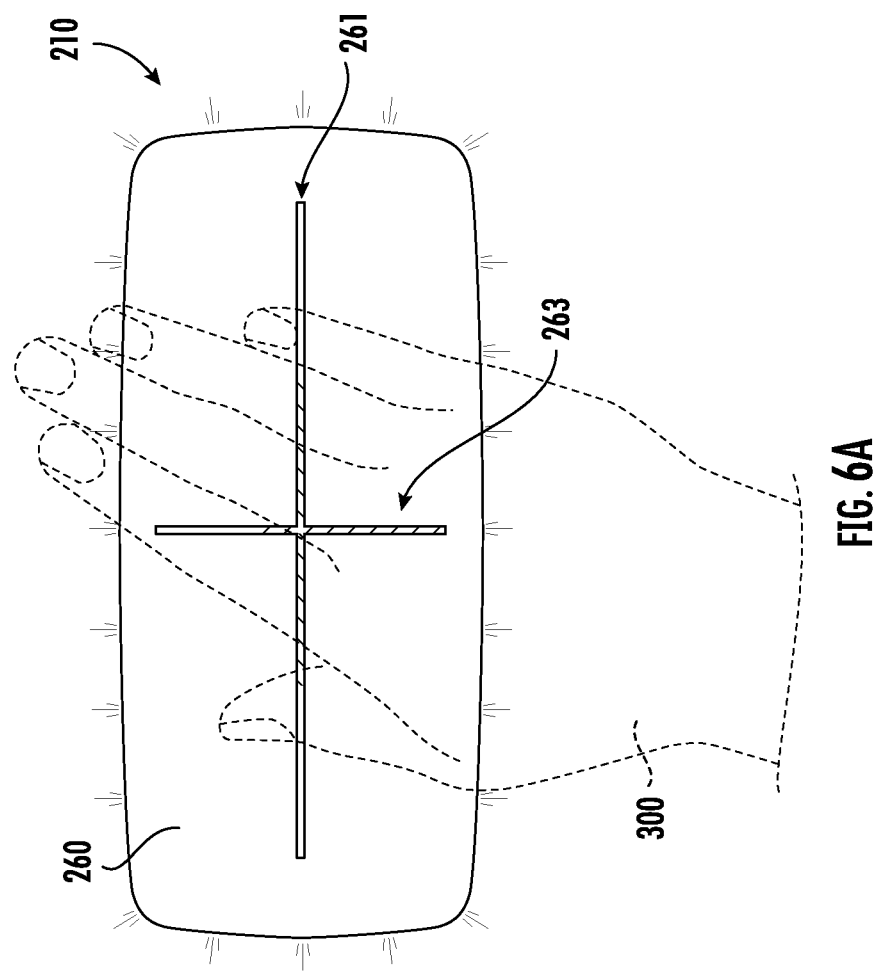

To control water through the plumbing assembly 105, a user may place their hand 300 (or other body part) above the sensory surface 260, as shown in FIGS. 6A-6D. For example, as shown in FIG. 6B, the plumbing control system 200 may not be illuminated when not in use (i.e., is in an OFF state). When the user's hand 300 is then placed in front of sensory surface 260, as shown in FIG. 6C, the one or more sensors 281, 284, 286 within the housing 265 may then sense the presence and proximity of the user's hand 300. In response, as shown in FIG. 6D, the one or more light sources 283 may illuminate at least one of the indicators 261, 263, indicating the plumbing control system 200 is in an ON state and may subsequently initiate flow of water through the plumbing assembly 105. In various embodiments, the control system 200 may be configured to initiate water flow through the plumbing assembly 105 at a default flow rate and/or default temperature. In various embodiments, the default flow rate may be approximately 70% of the maximum flow rate and the default temperature may be a warm temperature. At least one of the regions 267, 269, 271, 273 may display the default flow rate and/or default temperature in response to the user placing their hand 300 above the sensory surface 260. In various embodiments, a color and/or intensity of the one or more light sources 283 may also indicate to a user the operational status of the control system 200.

Figure 7B:
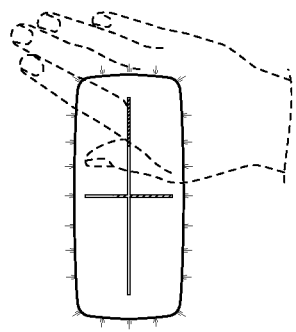
FIGS. 7A-7D are top views of a user interacting with the control unit of FIG. 4, according to an exemplary embodiment.
Figure 7C:
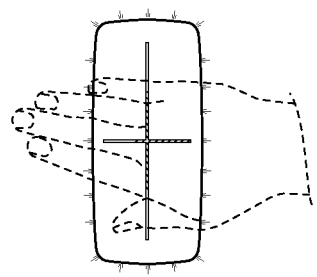
Figure 7D:
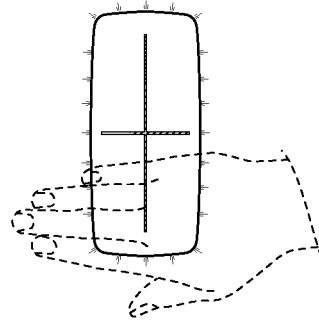
Figure 7A:
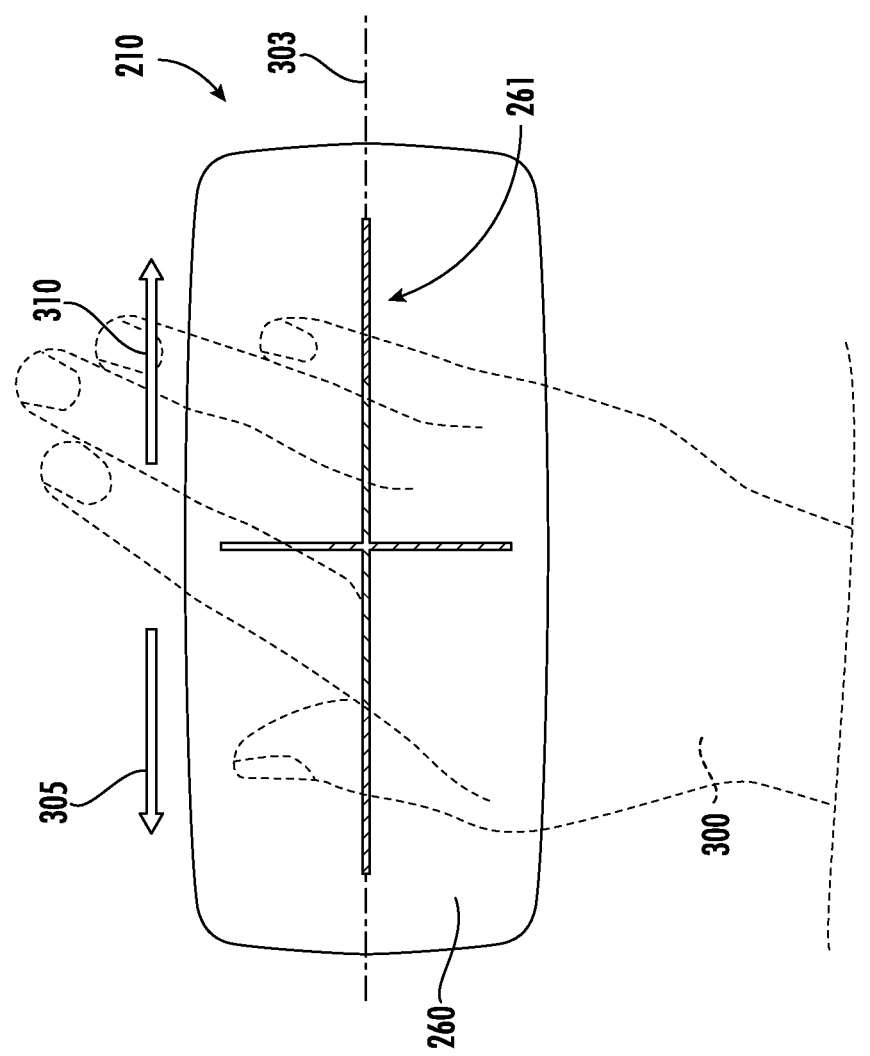

To adjust a temperature of the water flowing through the plumbing assembly 105, the user may move their hand 300 along the first axis 303 in a direction 305 or a direction 310, which is opposite the direction 305, as shown in FIG. 7A. For example, if the user intends to lower the temperature of water flowing through the plumbing assembly 105, the user may move their hand 300 in the direction 305 (e.g., as shown in FIG. 7D), which is detected by at least one of the sensors 281, 284, 286 (e.g., as shown in FIG. 7C). The user's motion sensed by the sensors 281, 284, 286 is then transmitted to the diverters 220, 222 and/or the valve and step motors 225, 227 by the controllers 280, 282. Accordingly, a configuration of at least one of the diverters 220, 222 and/or the valve and step motors 225, 227 may be adjusted such that a ratio of hot water and cold water through the hot and cold water inlets 215, 217 is reduced to consequently reduce the temperature of water through the plumbing assembly 105. Similarly, if the user intends to raise the temperature of the water flowing through plumbing assembly 105, the user may move their hand 300 in the direction 310 (e.g., as shown in FIG. 7B), which is detected by at least one of the sensors 281, 284, 286, and the ratio of hot water and cold water through the hot and cold water inlets 215, 217 may be increased to thus increase the temperature of the water through the plumbing assembly 105. In various embodiments, at least one of the regions 267, 269, 271, 273 may display the water temperature in real time so that the user can precisely adjust the water temperature flowing through the plumbing assembly 105. The indicator 261 may also change in color and/or intensity based on the current temperature of water flowing through the plumbing assembly 105.

To adjust a flow rate of the water flowing through the plumbing assembly 105, the user may move their hand 300 along the second axis 304 in a direction 325 or a direction 325, which is opposite the direction 320, as shown in FIG. 8A. For example, if the user intends to lower the rate of water flowing through the plumbing assembly 105, the user may move their hand 300 in the direction 320 (e.g., as shown in FIG. 8D), which is detected by at least one of the sensors 281, 284, 286 (e.g., as shown in FIG. 8C). The user's motion sensed by the sensors 281, 284, 286 is then transmitted to the diverters 220, 222 and/or the valve and step motors 225, 227 by the controllers 280, 282. Accordingly, a configuration of at least one of the diverters 220, 222 and/or the valve and step motors 225, 227 may be adjusted such that an amount of hot water and cold water through the hot and cold water inlets 215, 217 is reduced to consequently reduce the flow rate of water through the plumbing assembly 105. Similarly, if the user intends to raise the rate of the water flowing through plumbing assembly 105, the user may move their hand 300 in the direction 325 (e.g., as shown in FIG. 8B), which is detected by at least one of the sensors 281, 284, 286, and the amount of hot water and cold water through the hot and cold water inlets 215, 217 may be increased to thus increase the flow rate of the water through the plumbing assembly 105. In various embodiments, at least one of the regions 267, 269, 271, 273 may display the water flow rate in real time so that the user can precisely adjust the rate of water flowing through the plumbing assembly 105. The indicator 263 may also change in color and/or intensity based on the current rate of water flowing through the plumbing assembly 105. In various embodiments, water flow through the plumbing assembly 105 may be turned off by the user moving their hand in the direction 300 and/or based on a speed of the user movement.

In various embodiments, the control system 200 may be configured to operate according to one or more preset modes. For example, the control system 200 may be configured to automatically power off after a predetermined amount of time such that excess water does not flow through the plumbing assembly 105. In other embodiments, the control system 200 may be configured to operate within one or more predetermined temperature and/or flow rate ranges to prevent injury to a user (e.g., by limiting a maximum temperature of the water through the plumbing assembly 105), prevent water waste (e.g., by limiting a maximum flow rate through the plumbing assembly 105), prevent plumbing freezes (e.g., by maintaining a constant flow rate or initiating periodic water flow through the plumbing assembly 105).

Figure 9:
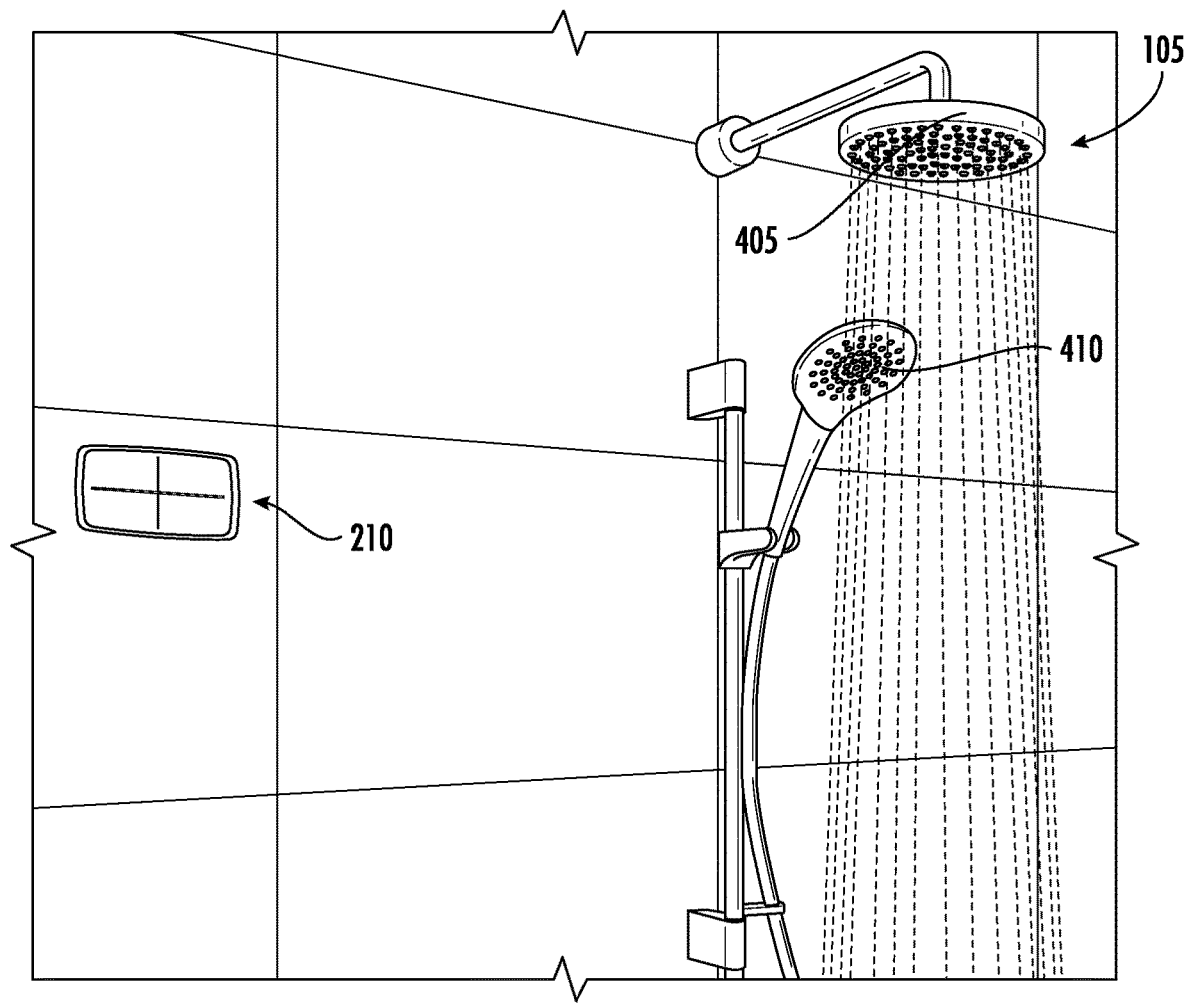
FIG. 9 is a perspective view of a plumbing system, according to an exemplary embodiment.
Figure 10:
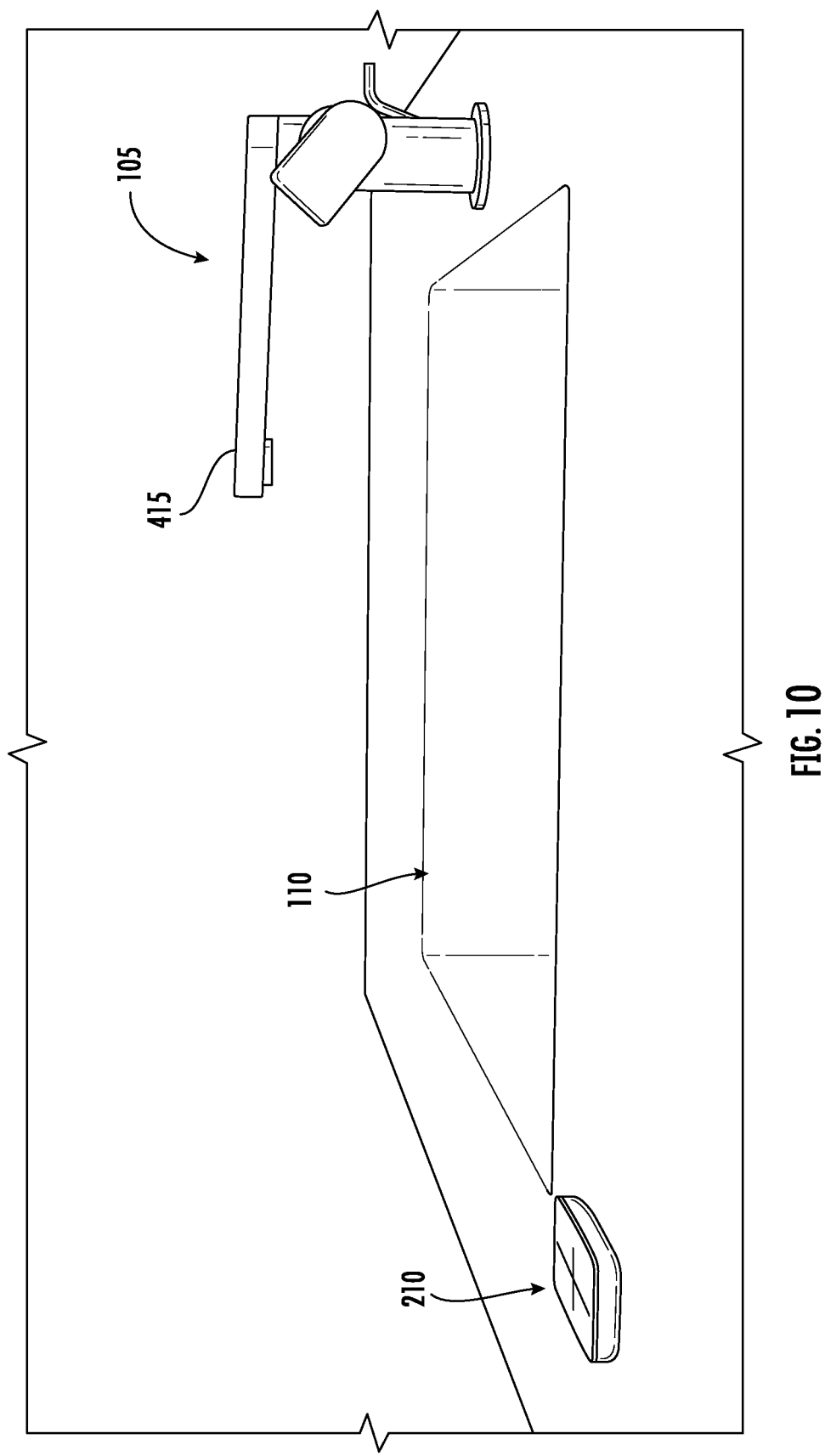
FIG. 10 is a perspective view of a plumbing system, according to another exemplary embodiment.

As described above, the plumbing system 100 is described primarily with respect to faucets. However, it is contemplated that the plumbing system 100 is not limited to any particular type of plumbing structure and can be used to monitor and control flow through a variety of different types of plumbing structures (e.g., sinks, faucets, showers, bath spouts, hoses, pipes, valves, etc.). As shown in FIG. 9, the plumbing control system 200 may be incorporated within a shower setting, wherein the plumbing assembly 105 includes multiple water outlets, such as a shower head 405 and/or a handheld wand 410. The control unit 210 may be mounted within the shower area adjacent to the plumbing assembly 105 to enable a user to control water flow and temperature therethrough. In other embodiments, the plumbing control system 200 may be incorporated within a sink setting, as shown in FIG. 10, wherein the plumbing assembly 105 includes a single water outlet, such as a faucet 415, which expels water into a sink (i.e., receptacle 110). The control unit 210 may then be mounted within or adjacent to the sink and/or the faucet 415 to enable a user to control water flow and/or temperature through the plumbing assembly 105.

Figure 11:
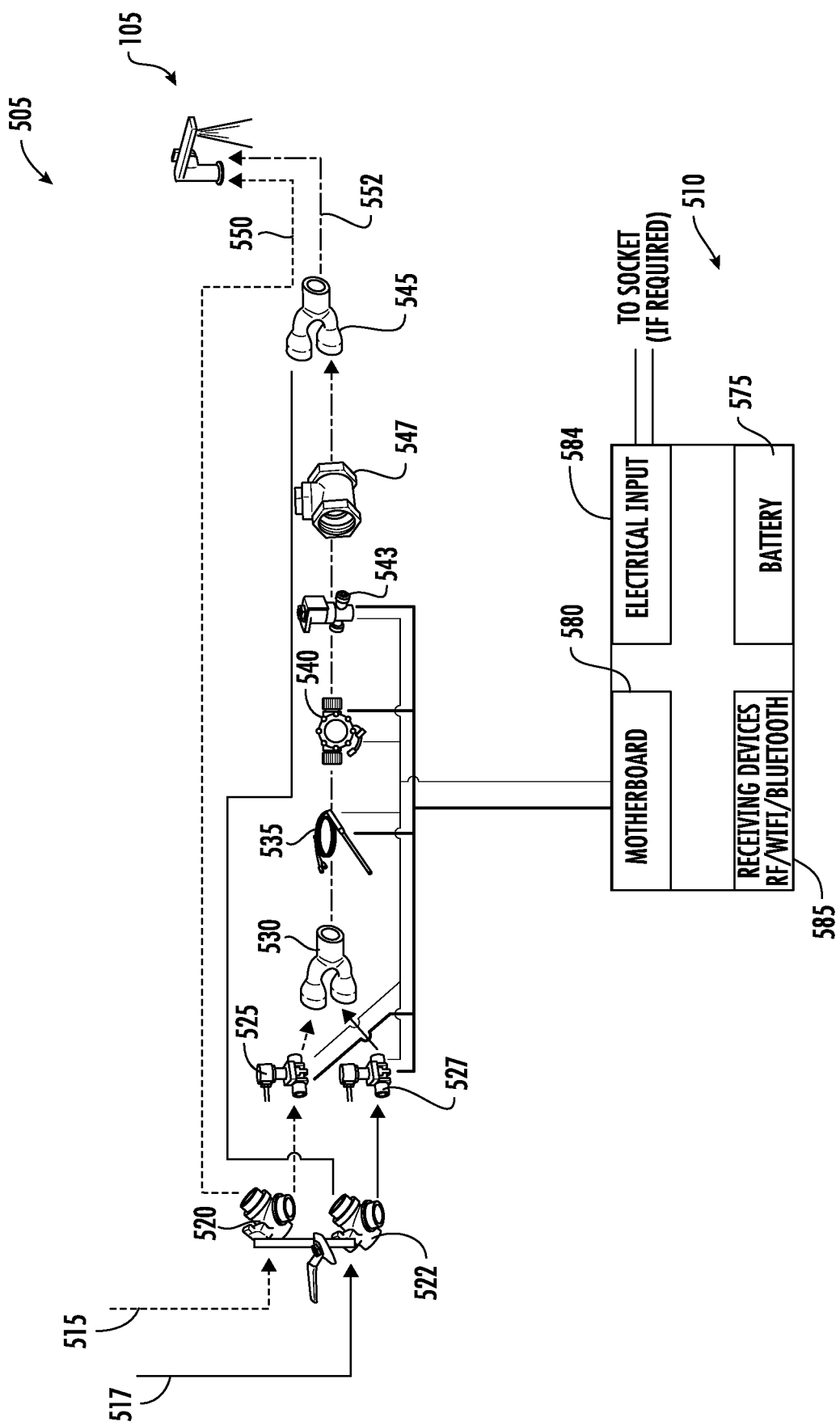
FIG. 11 is a schematic representation of a control assembly in a series configuration within the plumbing system of FIG. 1, according to an exemplary embodiment.

FIG. 11 shows a control assembly 505 in a series configuration, according to an exemplary embodiment. In various embodiments, the control assembly 505 may be similar or equivalent to the control assembly 205, where elements 510-552 of the control assembly 505 are respectively equivalent to elements 210-252 of the control assembly 205. Accordingly, the control assembly 505 receives input from the control unit 510, which a user may interact with to change one or more operating conditions of the plumbing system 100.

As shown, the control unit 510 may be configured such it is communicably coupled to at least one of the first valve and stepper motor 525, the second valve and stepper motor 527, the thermocouple 535, the flowmeter 540, or a solenoid valve 543. The control unit 510 may include one or more controllers 580 (shown as a motherboard in FIG. 11), which may be in communication with one or more processors and memories, where the one or more controllers 580 are configured to receive signals from at least one of an electrical input 584, a receiving device 585, or a power source 575 (shown as a battery in FIG. 11) and send one or more control signals to at least one of the first valve and stepper motor 525, the second valve and stepper motor 527, the thermocouple 535, the flowmeter 540, or a solenoid valve 543 in response. In various embodiments, the electrical input 584 is configured to receive electricity, such as from the power source 575 or from a grid, and adjust (e.g., step down) for components within the control unit 510. In some embodiments, the one or more receiving devices 584 may be configured to receive one or more inputs from an input source (e.g., user, user device, other control device, etc.) and communicate the one or more inputs to the one or more controllers 580. In various embodiments, the one or more receiving devices 584 may include a plurality of sensors. The power source 575, which is configured to supply power to components within the control unit 510, may be a lithium-ion battery. In various embodiments, the control assembly 505 may also include one or more non-return valves 547 in fluid communication with at least one of the water diverters 520, 522, where the one or more non-return valves 547 are configured to prevent backflow within the control assembly 505.

Figure 12A:
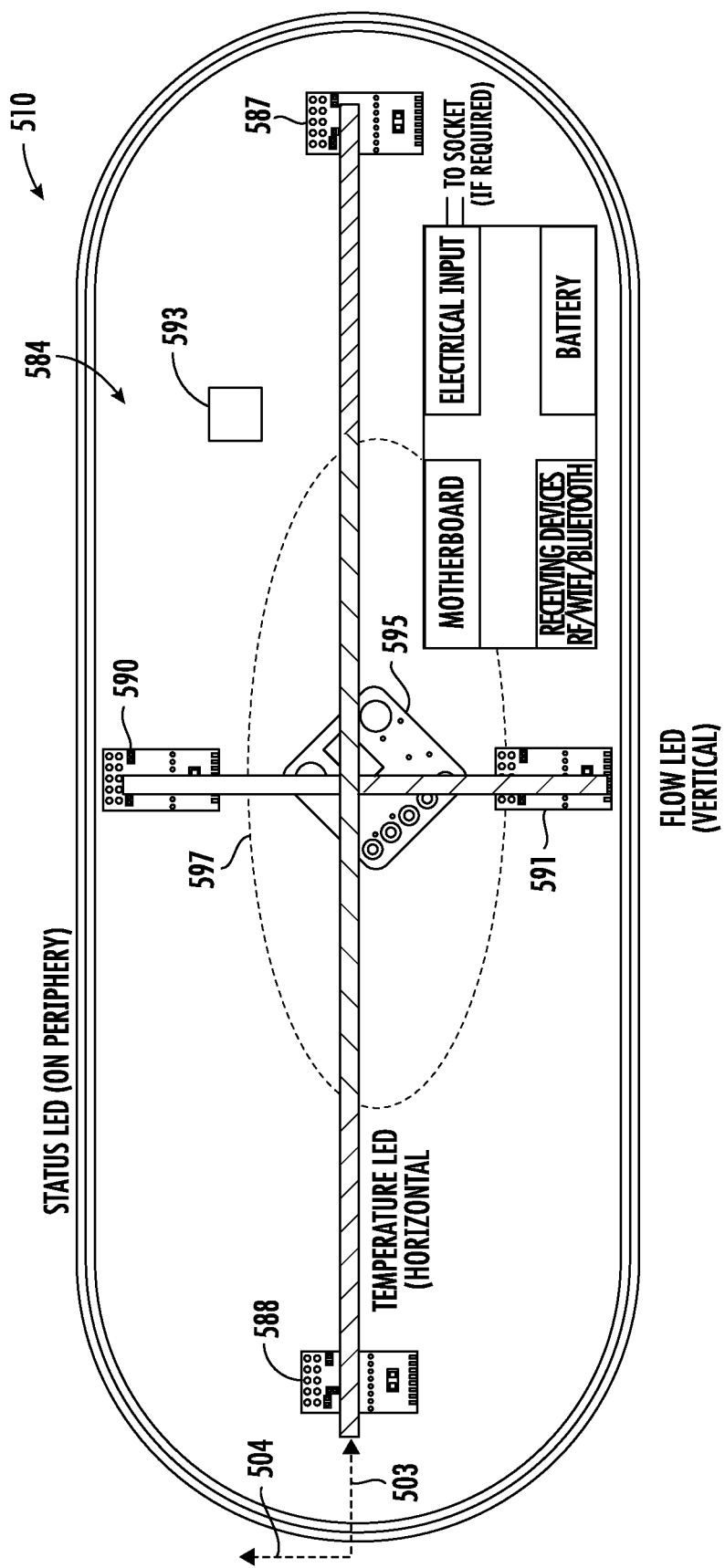
FIG. 12A is a schematic representation of a control unit within the control assembly of FIG. 11, according to an exemplary embodiment.
Figure 12B:
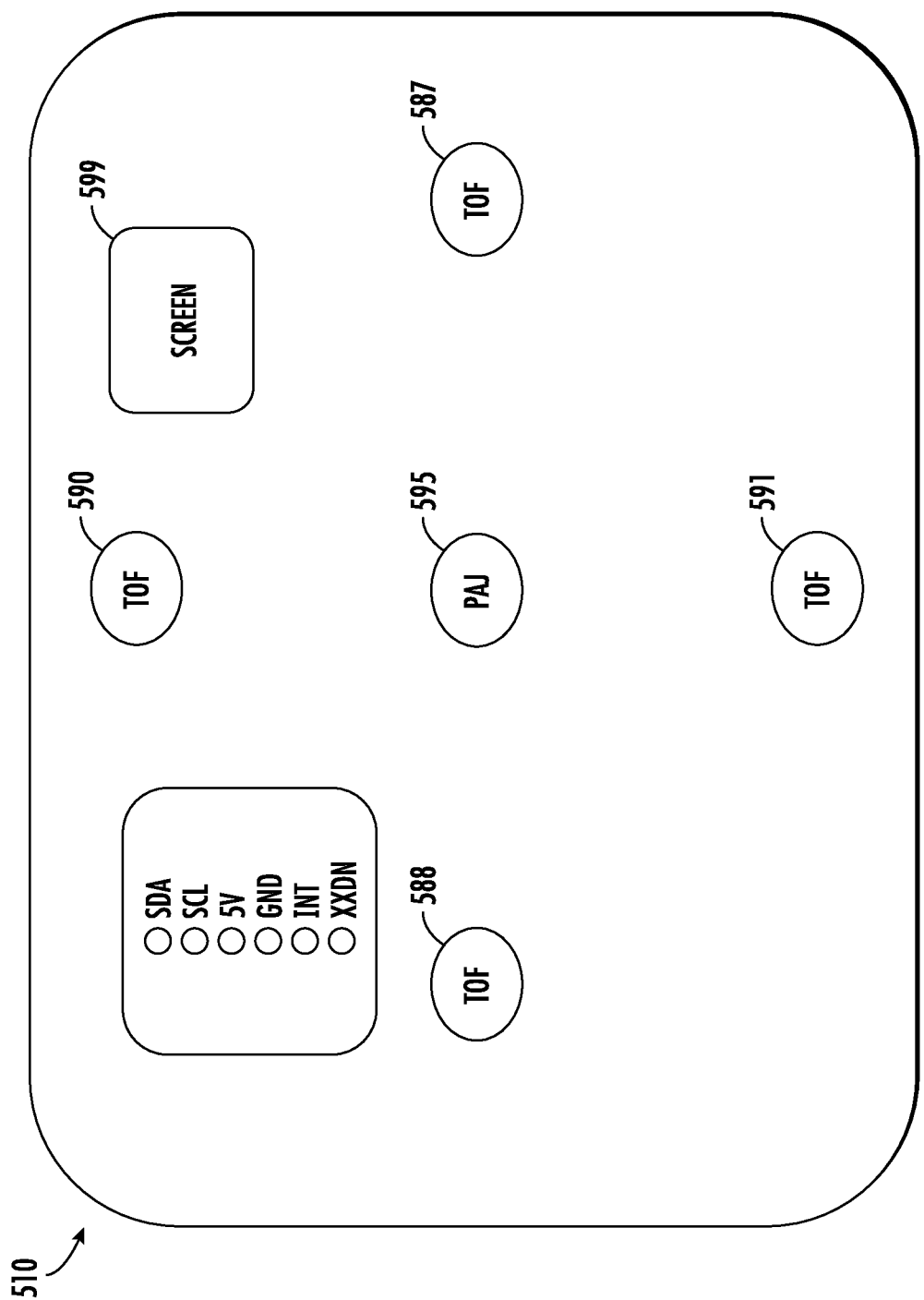
FIG. 12B is a schematic representation of the control unit within the control assembly of FIG. 11, according to another exemplary embodiment.

FIGS. 12A-B show schematic representations of the control unit 510, according to various exemplary embodiments. As shown, the control unit 510 incudes one or more receiving devices 584 (e.g., sensors, user input devices, etc.), which may cooperatively operate to sense a user movement, gesture (i.e., motion or movement of the user in one or more directions), or other interaction (e.g., touch) with the control unit 510 and transmit one or more signals to the one or more controllers 580 in response. As shown, the one or more receiving devices 584 within the control unit 510 may include a first time-of-flight (TOF) sensor 587 and a second TOF sensor 588, where the first TOF sensor 587 is disposed on a first side of the control unit 510 (i.e., the right side in FIG. 12A) and the second TOF sensor 588 is disposed on a second side of the control unit 510 (i.e., the left side in FIG. 12A) opposite the first side. The first and second TOF sensors 587, 588 are arranged such that they are substantially coplanar (e.g., positioned at or near a front surface of the control unit 510) and aligned along a first axis 503 of the control unit 510. Each of the first and second TOF sensors 587, 588 may be configured to detect or measure a distance between the user's hand and the respective TOF sensor 587, 588 by measuring an amount of time required for light (e.g., infrared light, optical light, ultraviolet light, or other electromagnetic radiation of any wavelength) emitted by the TOF sensors 587, 588 to travel to the user's hand and return to the TOF sensors 587, 588. In some embodiments, the first and second TOF sensors 587, 588 are infrared (IR) sensors and configured to sense one or more user gestures by detecting and recording at least one of a presence or proximity of a user's hand in front of the control unit 510.

A gesture recognition sensor ("PAJ sensor") 595 is disposed between (e.g., at a midpoint) the first and second TOF sensors 587, 588, where the PAJ sensor 595 is configured to record a user gesture. In various embodiments, the PAJ sensor 595 may be an IR sensor, having four directional diodes. By recording a change in presence and/or proximity over time of the user's hand between the first and second TOF sensors 587, 588 associated with the gesture recorded by the PAJ sensor 595, the TOF sensors 587, 588 may be used to determine a velocity of the user's hand (and thus of the gesture). For example, measurements taken by the PAJ sensor 595 and the TOF sensors 587, 588 at different times can be used to determine the location of the user's hand at each time. A change in location can then be divided by the amount of time elapsed to determine the velocity of the user's hand. The gesture, characterized by a direction and a velocity associated with the user's hand, and which is associated with one or more control functions of the control unit 510, may then be transmitted to the one or more controllers 580 to change an operating state of one or more components within the control assembly 505.

Similarly, the control unit 510 may include a third TOF sensor 590 and a fourth TOF sensor 591 disposed on a third side and a fourth side of the control unit 510, respectively. The third and fourth TOF sensors 590, 591 may be substantially coplanar and aligned with a second axis 504 of the control unit 510, where the second axis 504 is substantially perpendicular to the first axis 503. Like the first and second TOF sensors 587, 588, the third and fourth TOF sensors 590, 591 may be infrared (IR) sensors and configured to sense one or more user gestures by detecting and recording at least one of a presence or proximity of a user's hand in front of the control unit 510. By recording a change in presence and/or proximity over time of the user's hand between the third and fourth TOF sensors 590, 591 associated with the gesture recorded by the PAJ sensor 595, the TOF sensors 590, 591 may be used to determine a velocity of the user's hand (and thus of the gesture). In various embodiments, the PAJ sensor 595 may be disposed at or near a midpoint between the sensors 590, 591. The gesture, characterized by a direction and a velocity associated with the user's hand, and which is associated with one or more control functions of the control unit 510, may then be transmitted to the one or more controllers 580 to change an operating state of one or more components within the control assembly 505.

Advantageously, by including multiple pairs of TOF sensors 587, 588, 590, and 591 arranged as shown in FIG. 12A, the control unit 510 can determine the location of the user's hand along multiple orthogonal dimensions of three-dimensional space. For example, the first and second TOF sensors 587, 588 can be used to determine the location of the user's hand along a first dimension that aligns with the first axis 503 (e.g., left to right in FIG. 12A). Similarly, the third and fourth TOF sensors 590, 591 can be used to determine the location of the user's hand along a second dimension that aligns with the second axis 504 (e.g., top to bottom in FIG. 12A). By combining measurements from the TOF sensors 587, 588, 590, and 591 and/or the PAJ sensor 595, the control unit 510 can also determine the location of the user's hand along a third dimension orthogonal to both the first and second dimensions (e.g., perpendicular to the front surface of the control unit 510). This allows the control unit 510 to determine where and when the user's hand is moving in three-dimensional space to enable a variety of different types of gestures (e.g., linear gestures, two-dimensional gestures, three-dimensional gestures, etc.) to be detected and used for control purposes. In various embodiments, the first axis 503 and second axis 504 are orthogonal or non-orthogonal. Similarly, the first dimension, second dimension, and third dimension may be orthogonal dimensions of three-dimensional space or non-orthogonal dimensions in various embodiments. For example, the first and second dimensions (and their corresponding axes 503 and 504) are not necessarily perpendicular or orthogonal, but rather can be oriented at any relative angle. In various embodiments, the first and second dimensions (and their corresponding axes 503 and 504) are non-orthogonal and non-parallel with each other, or may be both orthogonal and non-parallel with each other.

In some embodiments, the control unit 510 is capable of detecting and distinguishing between gestures defined not only by the spatial locations of the user's hand, but also by its velocity or other metrics that incorporate a time element (e.g., speed, acceleration, etc.). As such, gestures can be defined in up to four dimensions including the three spatial dimensions and a time dimension. For example, the control unit 510 can be configured to distinguish between a quick movement of the user's hand and a slow movement of the user's hand along the same path and may map quick movement to a first gesture and slow movement to a second gesture. The first gesture may trigger the control unit 510 to perform a first control action, whereas the second gesture may trigger the control unit 510 to perform a second control action. In some embodiments, the control unit 510 stores a database of various gestures, which can be defined or characterized by a time series of locations of the user's hand in up to three dimensions to map out a path in up to three-dimensional space and may define the speed that the user's hand moves along the path. The path can be defined by absolute locations (e.g., based on absolute distance to the sensor unit 510) or relative locations that are defined based on the point in space at which the gesture begins. When a user's hand is detected within the detection region, the control unit 510 may record the locations of the user's hand over time and match the detected locations and times to a gesture stored in the database.

In various embodiments, a gesture sensed between the first and second TOF sensors 587, 588 may cause the one or more controllers 580 to change a first operating state of one or more components in the control assembly 505. Similarly, a gesture sensed between the third and fourth TOF sensors 590, 591 (and recorded by the PAJ sensor 595) may cause the one or more controllers 580 to change a second operating state of one or more components in the control assembly 505. For example, a gesture sensed between the first and second TOF sensors 587, 588 may control a temperature of water flowing through the plumbing assembly 105. A gesture sensed between the third and fourth TOF sensors 590, 591 may control a flow of water through the plumbing assembly 105. The control unit 510 may also include one or more passive infrared (PIR) sensors 593, which may be configured to detect a proximity of a user's hand in front of the control unit 510. Accordingly, the control unit 510 may be configured to active in response to the one or more PIR sensors 593 detecting a presence of a user's hand within a predetermined threshold.

As described above, one or more components within the control unit 510 (e.g., the sensors 58, 588, 590, 591, 593, 595) may receive power from the power source 575. To charge the power source 575, in various embodiments, the control unit 510 may be temporarily coupled to a grid or other power supply (e.g., via a wall plug, USB, etc.). In other embodiments, as shown in FIG. 12A, the control unit 510 may include a wireless charging zone 597, which may include one or more electromagnetic inductive charging components, radiative electromagnetic resonant charging components, or uncoupled radio frequency wireless charging components. Accordingly, the control unit 510 may be wirelessly charged via the wireless charging zone 597 to charge the power source 575, which enables use of the control unit 510 remotely from the plumbing assembly 105. In various embodiments, as shown in FIG. 12B, the control unit 510 may also include a display ("screen") 599 that is communicably coupled with the one or more controllers 580, where the screen 599 is configured to display (i.e., provide a visible representation or illustration of) an operational state associated with one or more components within the control assembly 505 and/or the plumbing assembly 105.

Figure 13:
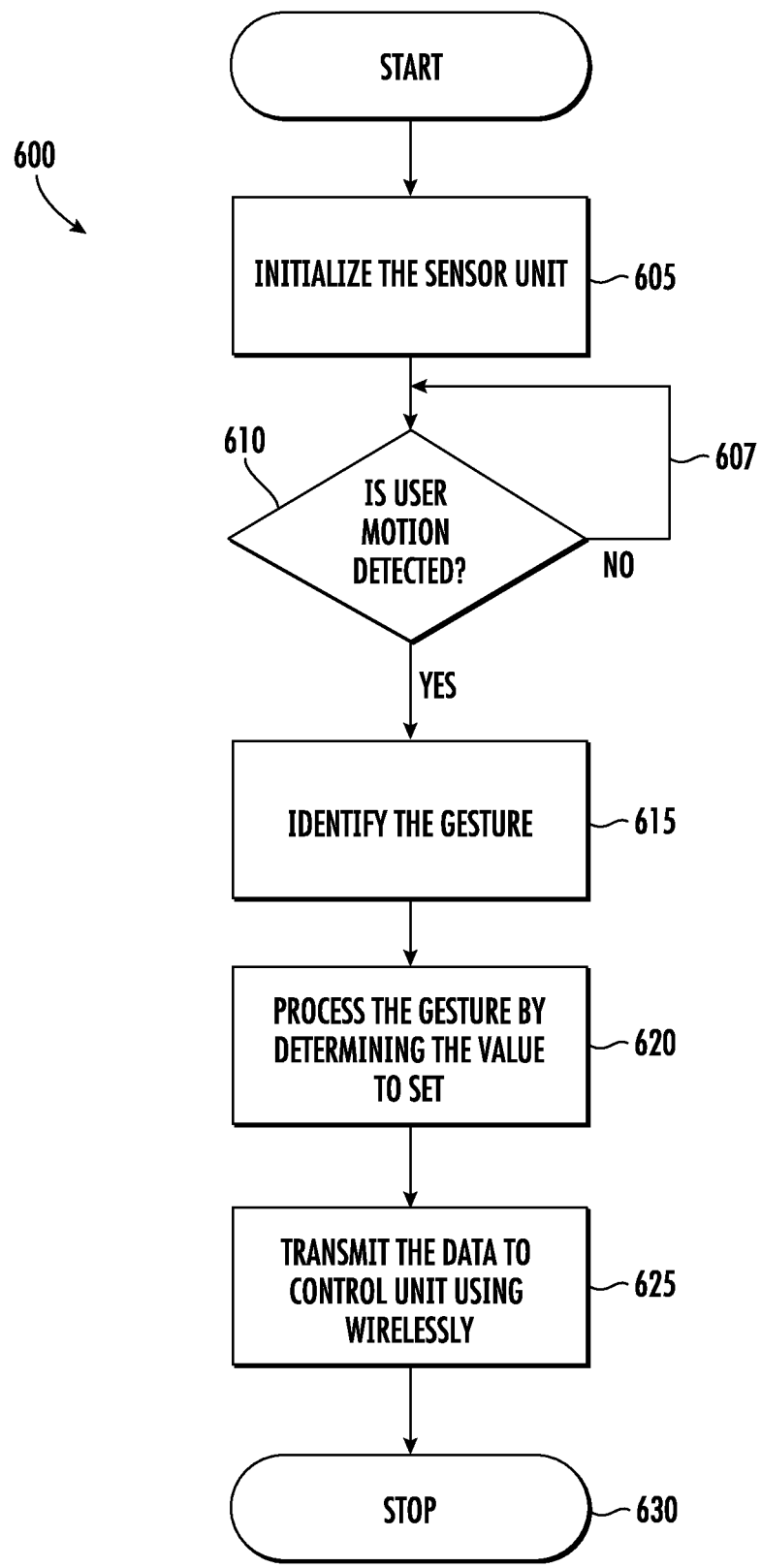
FIG. 13 is a flow diagram illustrating a method of operation of the control unit, according to an exemplary embodiment.

A method 600 carried out by the control unit 510 for controlling one or more operating states of the control assembly 505 is depicted in FIG. 13. In a first operation 605, the control unit 510 may initialize in response to the PIR sensor 593 detecting a user's hand in front of or near the control unit 510. Responsive to initializing in the operation 605, the one or more controllers 580 may determine whether or not motion (i.e., of the user's hand) was detected based on inputs received from one or more of the PAJ sensor 595 and/or the TOF sensors 587, 588, 590, 591 (operation 610). If the one or more controllers 580 determine that no motion was detected in an operation 607, the operation 610 may repeat or the control unit 510 may deactivate until another input is received by the PIR sensor 593. If the one or more controllers 580 determine that motion was detected, the one or more controllers 580 may determine a gesture associated with the motion based on inputs received from the PAJ sensor 595 and/or the TOF sensors 587, 588, 590, 591 in an operation 615. The one or more controllers 580 may process the gesture based on at least one of a direction, a proximity, or a velocity associated with the gesture as determined by the TOF sensors 587, 588, 590, 591, and as a result, determine an operational function (e.g., a flow rate, a temperature, etc.) associated with the control assembly 505 that corresponds to the gesture (operation 620). In an operation 625, the one or more controllers 580 may then transmit one or more control signals to one or more components within the control assembly 505 (e.g., the first valve and stepper motor 525, the second valve and stepper motor 527, the thermocouple 535, the flowmeter 540, the solenoid valve 543, etc.) to change or adjust an operational state thereof. Finally, after the one or more controllers 580 has changed or adjusted the operational state of one or more components within the control assembly 505, the control unit 510 may then deactivate in an operation 630 until another input is received by the PIR sensor 593.

Figure 14C:
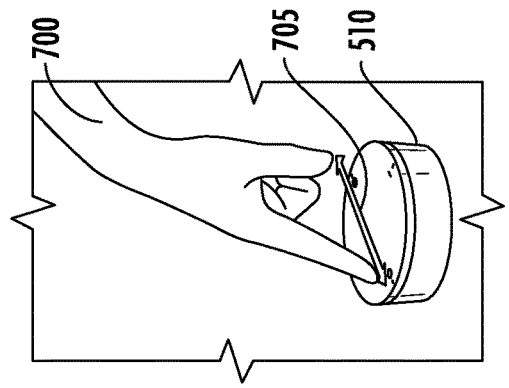
FIGS. 14A-F show perspective views of a user interacting with the control unit of FIG. 11, according to various exemplary embodiments.
Figure 14F:
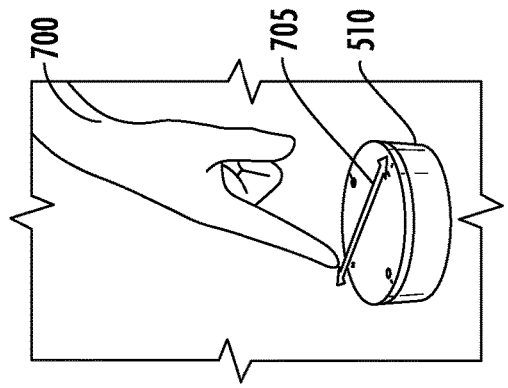
Figure 14B:
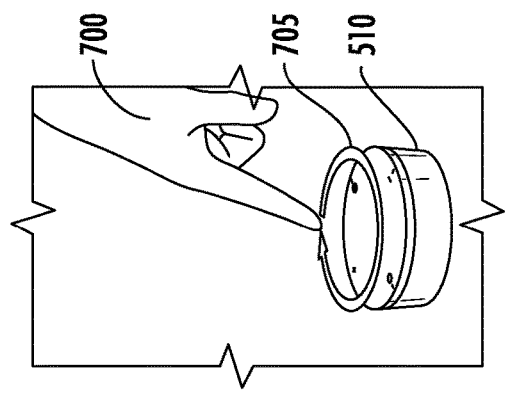
Figure 14E:
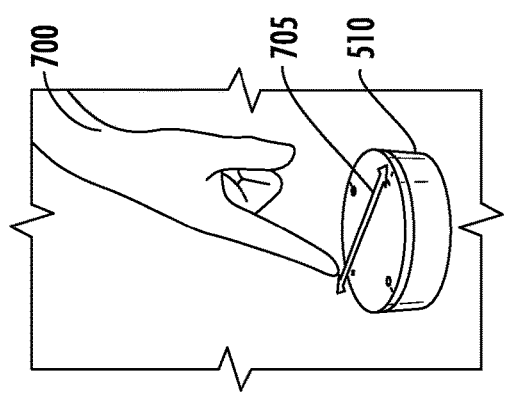
Figure 14A:
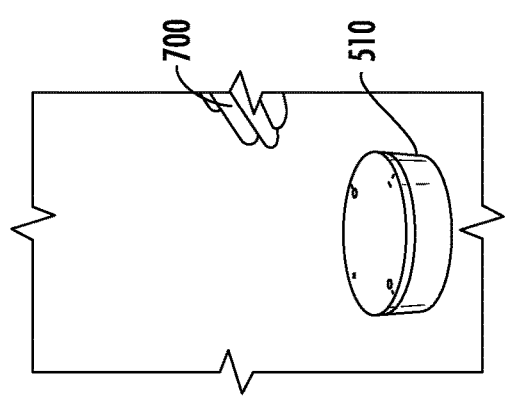
Figure 14D:
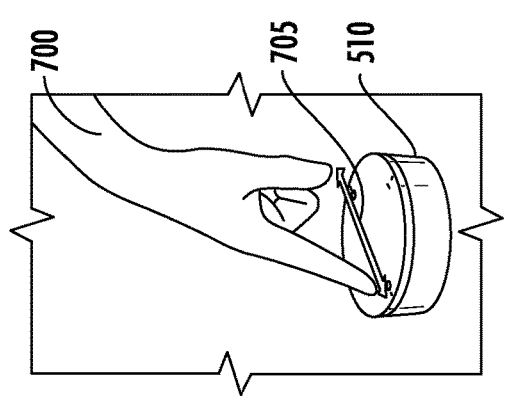

FIGS. 14A-F illustrate example gestures that may be sensed and recorded by the control unit 510. As shown in FIG. 14A, a user's hand 700 may approach or be positioned near a sensing surface (e.g., similar or equivalent to the sensory surface 260), which may be sensed by the PTR sensor 593. In some embodiments, such as shown in FIG. 14B, the user's hand 700 may generate a gesture 705, where the gesture 705 includes a wave (e.g., turning, circular, or other non-linear motion), which may be sensed by the PAJ sensor 595. In other embodiments, such as shown in FIG. 14C, the gesture 705 may include a linear motion in a first direction and aligned with the first axis 503 of the control unit 510, which may be sensed by the TOF sensors 587,588. Similarly, the gesture 705 may include a linear motion in a second direction and aligned with the first axis 503 of the control unit 510, as shown in FIG. 14D, where the TOF sensors 587, 588 may sense and characterize the gesture 705 based on its direction and velocity. In various embodiments, such as shown in FIG. 14E, the gesture 705 may include a linear motion in a first direction and aligned with the second axis 504 of the control unit 510, which may be sensed by the TOF sensors 590, 591. Similarly, the gesture 705 may include a linear motion in a second direction and aligned with the second axis 504 of the control unit 510, as shown in FIG. 14F, where the TOF sensors 590, 591 may sense and characterize the gesture 705 based on its direction and velocity.

In various embodiments, the control unit 510 (via the sensors 587, 588, 590, 591, 593, 595) may be configured to detect eleven distinct gestures. As described previously, during operation, the one or more controllers 580 may receive one or more inputs from the PAJ sensor 595 to determine the gesture 705, and subsequently (or concurrently) receive one or more inputs from the TOF sensors 587, 588, 590, 591. The one or more controllers 580 may then use inputs from at least two of the TOF sensors 587, 588, 590, 591 to determine the control signal (i.e., associated with the control assembly 510) that corresponds to the identified gesture 705.

Because the TOF sensors 587, 588, 590, 591 detect not only direction but also velocity of the gesture 705 (i.e., based on a time at which each sensor is intercepted by the gesture), the control signal (and thus the corresponding operational state of the control assembly 505) may change or be based on the direction of the gesture 705 and the velocity of the gesture 705. In various implementations, the PAJ sensor 595 may determine directions associated with the gesture 705 (e.g., up, down, left, right, front, back, wave, proximity, clockwise or counterclockwise), which are received as inputs by the one or more controllers 580. Inputs associated with the TOF sensors 587, 588 (i.e., portions of the gesture 705 in directions aligned with the first axis 503) and/or the TOF sensors 590, 591 (i.e., portions of the gesture 705 in directions aligned with the second axis 504) may be subtracted to compute a time for the user's hand 700 to cross the control unit 510 during the gesture 705. Because a distance between TOF sensors 587, 588 and a distance between TOF sensors 590, 591 may be known, a velocity of the gesture 705 may be calculated via the one or more controllers 580 by dividing a distance traveled by the user's hand 700 during the gesture 705 by an amount of time the user's hand 700 was making the gesture 705. Accordingly, the one or more controllers 580 may determine a velocity of the gesture 705, in addition to recording a direction (or directions) of the gesture 705, to determine a control signal to change an operational state of one or more components within the control assembly 505. For example, a gesture 705 in a first direction along the first axis 503 with a first velocity may correspond to a first operational state, and a gesture 705 in a first direction along the first axis 503 with a second velocity may correspond to a second operational state. In various embodiments, the velocity may correspond with an increment of adjustment. For example, a larger velocity of the gesture 705 may result in a large increment of adjustment of the operational state of the control assembly 505. In another example, a smaller velocity of the gesture may result in a small increment of adjustment of the operational state of the control assembly 505.

In various embodiments, the one or more controllers 580 may be configured to halt adjustment of an operational state of the control assembly 505 in response to a second gesture following a first gesture 705. For example, a first gesture 705 may include movement of the user's hand 700 in a first direction along the first axis 503 at a first velocity and a second gesture may include a touch or a movement in a second direction along the first axis 503 at a second velocity. In response, the one or more controllers 580 may be configured to adjust one or more operational states of one or more components in the control assembly 505 based on the first gesture 705 and may halt adjustment in response to the second, subsequent gesture.

Figure 15I:
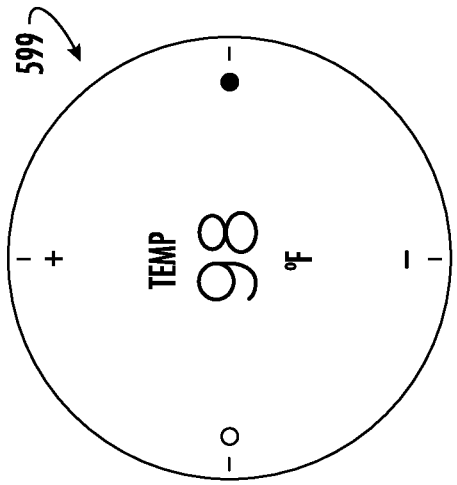
Figure 15L:
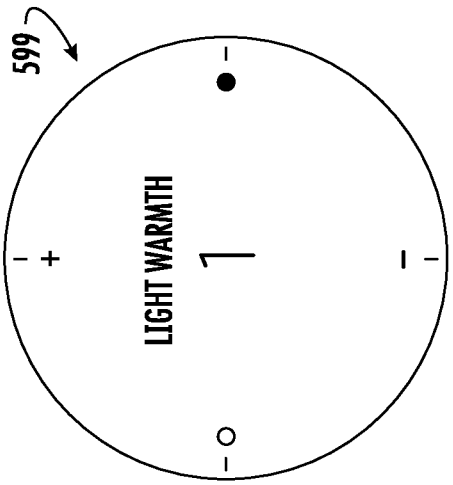
Figure 15H:
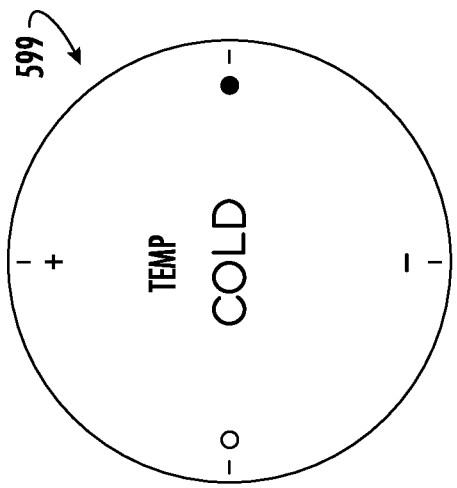
Figure 15K:
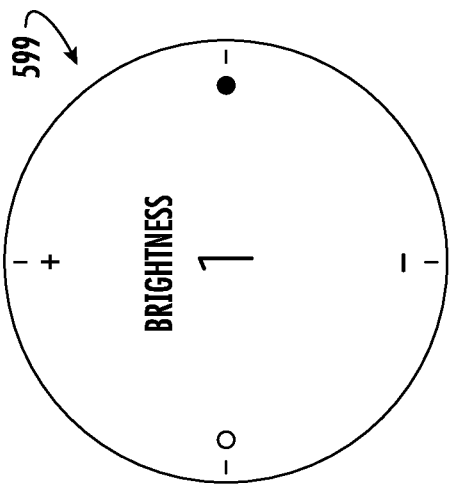
Figure 15G:
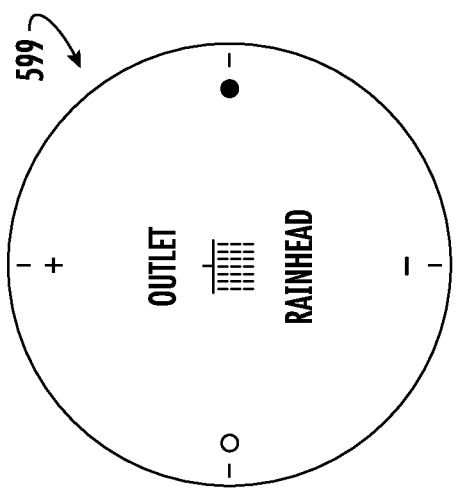
Figure 15J:
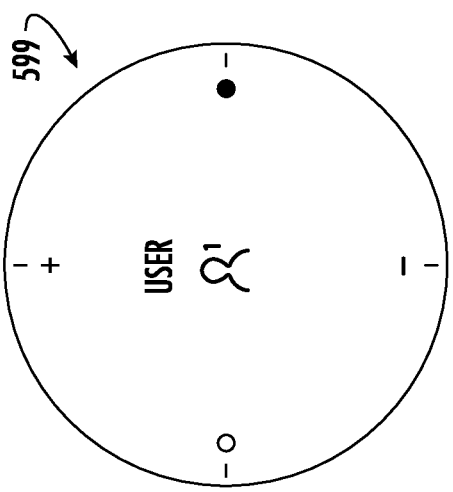

In various embodiments, the control unit 510 may be configured to adjust a myriad of operational states of components within control assembly 505. Before or during adjustment, the control unit 510 may be configured to display one or more indicators associated with the operational state to be adjusted in response to the gesture 705, as shown in FIGS. 15A-L. In some embodiments, such as shown in FIGS. 15A-C, the screen 599 of the control unit 510 may be configured to indicate a mode associated with the control assembly 505 and/or the plumbing assembly 105. For example, the mode may include a filling mode (FIG. 15A), a stream mode (FIG. 15B), or a flush mode (FIG. 15C), where the mode may be determined based on a type of plumbing assembly 105. In other embodiments, such as shown in FIGS. 15D-F, the screen 599 may be configured to indicate an amount of water flowing through the control assembly 505 (and thus through the plumbing assembly 105). For example, the screen 599 may indicate a flow level (FIG. 15D), a fill progress or percentage (FIG. 15E), or a fill amount or volume (FIG. 15F), where at least one of the flow level, progress, or volume may be set by the user or the manufacturer of the control assembly 505. In yet other embodiments, the screen 599 may be configured to indicate an outlet within the plumbing assembly 105, such as shown in FIG. 15G. In some embodiments, the screen 599 may be configured to indicate a water temperature characteristic (FIG. 15H) or a water temperature value (FIG. 15I). In other embodiments, the control assembly 505 and/or the control unit 510 may be configured for use based on one or more user profiles, where a user profile may be associated with one or more operational states of the control assembly 505. Accordingly, the screen 599 may be configured to indicate a user profile in use by the control unit 510 (FIG. 15J). In other embodiments, the screen 599 may be configured to indicate a display settings associated with the control unit 510 and/or the plumbing assembly 105. For example, the screen 599 may indicate a brightness level of an indicator light (e.g., on the control unit 510, on the plumbing assembly 105, or near the plumbing assembly 105), as shown in FIG. 15K. In another example, the screen 599 may indicate a characteristic, type, or level of a light (e.g., on the control unit 510, on the plumbing assembly 105, or near the plumbing assembly 105), such as shown in FIG. 15L.

Figure 16:
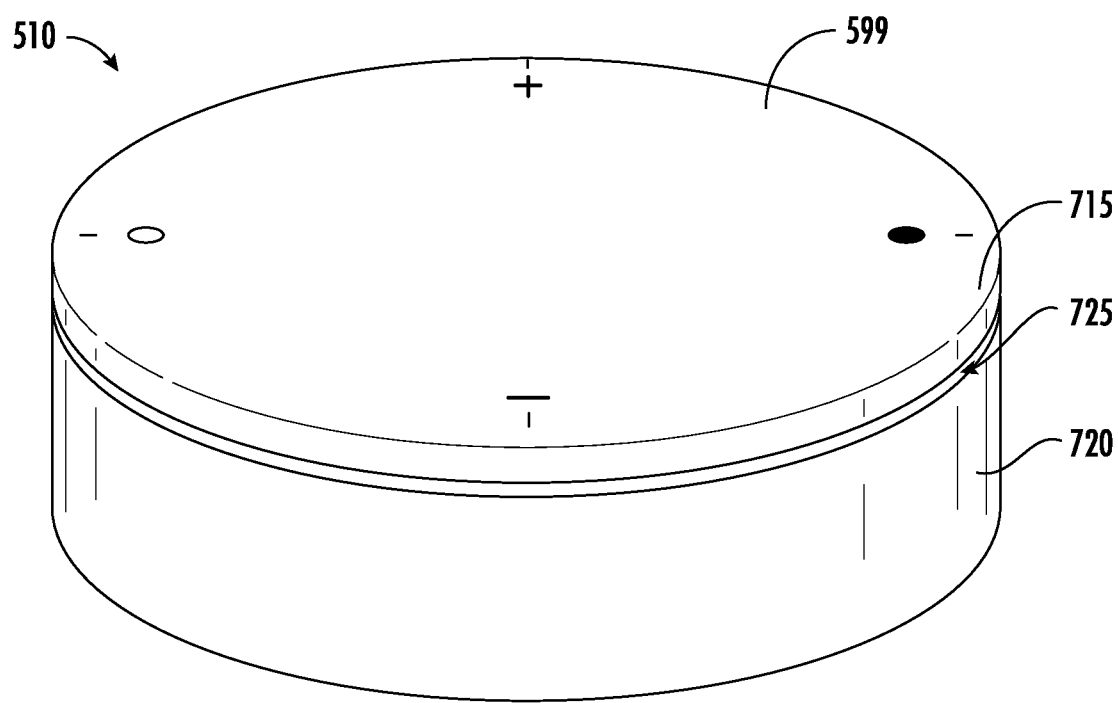
FIG. 16 is a perspective view of the control unit of FIG. 11, according to an exemplary embodiment.

The control unit 510 may be configured as a modular knob, as shown in FIG. 16. As shown, the control unit 510 may have a first portion 715, where the first portion 715 may include the one or more receiving devices 584 and the screen 599. The first portion may be coupled to a second portion 720, which may be configured to house the power source 575. An indicator 725 may be circumferentially disposed about the first portion 715 and/or the second portion 720, where the indicator 725 may include one or more light sources configured to indicate an activation state of the control unit 510 or an operational state of the control assembly 505. In various embodiments, the indicator 725 may include one or more light emitting diodes (LED) configured to change a brightness, intensity, and/or color based on a gesture 705 detected by the receiving devices 584.

Because the control unit 510 includes a power source 575 and may be configured for wireless charging (via the wireless charging zone 597), the control unit 510 may be readily repositionable during use and thus configured for remote control of a myriad of different plumbing assemblies 105. As shown in FIG. 17, the wireless charging zone 597 may be disposed within the second portion 720 (e.g., on a bottom side), where the wireless charging zone 597 includes one or more pins 728, and where the one or more pins 728 are configured to engage with a wireless charger 730 to facilitate charging of the power source 575 within the control unit 510. As shown, the wireless charger 730 may include a base 735 having a shape that is complementary to a shape of the second portion 720 such that the base 735 may accommodate the second portion 720 during charging of the control unit 510. In various embodiments, the control unit 510 may be customizable based on a type of coupled plumbing assembly 105 and/or user preference. For example, in various embodiments, the control unit 510 may be configured to have one or more switchable exterior portions, which may be interchanged (i.e., in a similar or equivalent manner as with the control unit 210) to change an appearance or aesthetic quality of the control unit 510.

It should be noted that although the present disclosure contemplates plumbing systems and plumbing assemblies in combination with a control unit, other systems and assemblies configurable for operation with a control unit are also considered. In various embodiments, the control unit (e.g., the control unit 210, 510) may be configured for use with one or more non-plumbing systems or assemblies including, but not limited to mirrors, fans, air circulation units, heating and ventilation air conditioning (HVAC) systems, elevators, and/or any other type of equipment, system, or device capable of receiving input from a user.

Notwithstanding the embodiments described above in FIGS. 1-17, various modifications and inclusions to those embodiments are contemplated and considered within the scope of the present disclosure.

As utilized herein with respect to numerical ranges, the terms "approximately," "about," "substantially," and similar terms generally mean+/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above.

It is important to note that any element disclosed in one embodiment may be incorporated or utilized with any other embodiment disclosed herein. For example, the plumbing assembly 105 of the exemplary embodiment described in at least paragraph(s) [0030] may be incorporated in the plumbing system 100 of the exemplary embodiment described in at least paragraph(s) [0018]. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A control unit for a plumbing assembly, the control unit comprising:
    a first pair of sensors arranged along a first axis of the control unit, the first pair of sensors configured to determine a velocity of at least one gesture along a first dimension aligned with the first axis;
    a second pair of sensors arranged a long a second axis of the control unit, the second pair of sensors configured to determine a velocity of the at least one gesture along a second dimension aligned with the second axis; and
    at least one controller operably coupled to the first pair of sensors and the second pair of sensors;
    wherein the at least one controller is configured adjust at least one operational state of the plumbing assembly based on the velocity of the at least one gesture along the first dimension and the velocity of the at least one gesture along the second dimension.

2. The control unit of claim 1, wherein at least one of the first pair of sensors or the second pair of sensors are time of flight (TOF) sensors.

3. The control unit of claim 1, further comprising a gesture recognition sensor disposed between a first sensor and a second sensor of the first pair of sensors.

4. The control unit of claim 3, wherein the gesture recognition sensor comprises four directional diodes.

5. The control unit of claim 1, wherein at least one of the first pair of sensors or the second pair of sensors are infrared sensors.

6. The control unit of claim 1, wherein:
    a first sensor of the first pair of sensors is disposed on a first side of the control unit and a second sensor of the first pair of sensors is disposed on a second side of the control unit, the second side being opposite the first side; and
    a first sensor of the second pair of sensors is disposed on a third side of the control unit and a second sensor of the second pair of sensors is disposed on a fourth side of the control unit, the fourth side being opposite the third side.

7. The control unit of claim 1, wherein the at least one gesture comprises a first gesture and a second gesture, and wherein the at least one operational state comprises a first operational state and a second operational state, the first gesture corresponding to the first operational state and the second gesture corresponding to the second operational state.

8. A plumbing control system comprising:
    a control unit communicably coupled to the control assembly, wherein an input received by the control unit causes the control assembly to adjust at least one of a water flow or a water temperature through the plumbing assembly;
    wherein the control assembly comprises:
        a first diverter and a second diverter respectively coupled to a first inlet and a second inlet; and
        a first valve and a second valve disposed downstream of the first diverter and the second diverter, wherein at least one of the first valve or the second valve is configured to control an amount of water flowing through at least one of the first diverter or the second diverter; and
    wherein the control unit comprises:
        a first pair of sensors arranged along a first axis of the control unit, the first pair of sensors configured to determine a velocity of at least one gesture along a first dimension aligned with the first axis;
        a second pair of sensors arranged a long a second axis of the control unit, the second pair of sensors configured to determine a velocity of the at least one gesture along a second dimension aligned with the second axis; and
        at least one controller operably coupled to the first pair of sensors and the second pair of sensors;
        wherein the at least one controller is configured adjust at least one operational state of at least one of the first valve or the second valve based on the velocity of the at least one gesture along the first dimension and the velocity of the at least one gesture along the second dimension.

9. The plumbing control system of claim 8, wherein the at least one gesture comprises a first gesture and a second gesture and the at least one operational state comprises a first operational state and a second operational state, the first gesture corresponding to the first operational state and the second gesture corresponding to the second operational state.

10. The plumbing control system of claim 9, wherein the first operational state corresponds to a first water flow and the second operational state corresponds to a second water flow.

11. The plumbing control system of claim 9, wherein the first operational state corresponds to a first water temperature and the second operational state corresponds to a second water temperature.

12. The plumbing control system of claim 9, wherein the first gesture is in a first direction and the second gesture is in a second direction opposite the first direction.

13. A plumbing system comprising:
   a plumbing assembly;
   a control assembly fluidly coupled to the plumbing assembly, a hot water source, and a cold water source, wherein hot water enters the control assembly through a hot water inlet and cold water enters the control assembly through a cold water inlet; and
   a control unit communicably coupled to the control assembly, wherein an input received by the control unit causes the control assembly to adjust at least one of a water flow or a water temperature through the plumbing assembly;
   wherein the control assembly comprises:
      a first diverter and a second diverter respectively coupled to the hot water inlet and the cold water inlet;
      a first valve fluidly coupled to the first diverter, the first valve configured to control a flow of hot water; and
      a second valve fluidly coupled to the second diverter, the second valve configured to control a flow of cold water;
      wherein the first diverter and the second diverter, and the first valve and the second valve are arranged in parallel; and
      wherein the plumbing assembly is fluidly coupled downstream of both the first valve and the second valve; and
   wherein the control unit comprises at least one sensor configured to receive an input based on at least one of a user presence or a user motion above the control unit, and the input causes a change in configuration of at least one of the first valve or the second valve.

14. The plumbing system of claim 13, wherein the at least one sensor comprises a first pair of sensors, the first pair of sensors being arranged along a first axis.

15. The plumbing system of claim 14, wherein the at least one sensor further comprises a second pair of sensors, the second pair of sensors being arranged along a second axis, the second axis being perpendicular to the first axis.

16. The plumbing assembly of claim 15, wherein the user motion comprises a gesture, and wherein the first pair of sensors and the second pair of sensors are configured to measure a velocity of the gesture along the first axis and the second axis.

17. The plumbing assembly of claim 13, wherein the control unit is a modular knob.

18. The plumbing assembly of claim 17, wherein the modular knob comprises a first portion and a second portion coupled to the first portion, wherein the first portion comprises the at least one sensor and the second portion comprises a power source.

19. The plumbing assembly of claim 17, wherein the modular knob comprises an indicator, the indicator being circumferentially disposed about the modular knob and comprising at least one light source, and wherein the indicator is configured to indicate an operational state of the control unit.

20. The plumbing assembly of claim 19, wherein the at least one light source is configured to change at least one of a brightness, intensity, or color based on the input.

* * * * *